United States Patent [19]

Szlam et al.

[11] Patent Number: 4,797,911
[45] Date of Patent: Jan. 10, 1989

[54] CUSTOMER ACCOUNT ONLINE SERVICING SYSTEM

[75] Inventors: Aleksander Szlam, Norcross; James W. Crooks, Jr., Marietta, both of Ga.; Curtis G. Marks, Minneapolis, Minn.

[73] Assignee: Inventions, Inc., Norcross, Ga.

[21] Appl. No.: 62,944

[22] Filed: Jun. 16, 1987

[51] Int. Cl.$^4$ .................... H04M 1/274; H04M 11/10
[52] U.S. Cl. ......................................... 379/67; 379/84; 379/92; 379/216; 379/246
[58] Field of Search ..................... 379/67, 69, 88, 216, 379/84, 92, 127, 246

[56] References Cited

U.S. PATENT DOCUMENTS

| | | | |
|---|---|---|---|
| 3,989,899 | 11/1976 | Norwich | 379/134 |
| 4,320,256 | 3/1982 | Freeman | 379/73 |
| 4,406,925 | 9/1983 | Jordan et al. | 379/93 |
| 4,438,296 | 3/1984 | Smith | 379/69 |
| 4,451,700 | 5/1984 | Keupner et al. | 379/88 |
| 4,599,493 | 7/1986 | Cave | 379/247 |

*Primary Examiner*—Thomas W. Brown
*Attorney, Agent, or Firm*—Jones, Askew & Lunsford

[57] ABSTRACT

A method and an apparatus for direct and immediate updating of customer account information, handling inquiries, and initiating communications is disclosed. A mainframe computer (16) contains customer or potential customer account information such as customer name, customer telephone number, customer account code, customer order status, etc. Mainframe computer (16) sends batches of customer account information to a system controller (11) via a data controller (15). System controller (11) directs trunk interface units (10a-10d) to dial the customer's telephone number and monitor the status of the outgoing calls. The trunk interface units (10a-10d) advise the system controller (11) when an outgoing call has been answered and, if an operator is available at an operator terminal (12a-12j), the system controller (11) directs a switch (13) to connect the answered trunk (T1-T16) to the available operator terminal and sends abbreviated customer account information to the operator terminal. The operator terminal then requests the full customer account information from the mainframe computer (16) via the data controller (15). The operator at the operator terminal 12 then conducts the necessary business with the customer and makes any desired changes in the customer account information in the mainframe computer (16). The changes are sent by the operator terminal (12), via the data controller (15), to the mainframe computer (16) for immediate updating and storage of the updated account information in the main database. The operator at the operator terminal (12) is relieved of the duties of obtaining the telephone number, dialing telephone number, and waiting for the party to answer, and is therefore utilized more efficiently. Furthermore, the customer account information in mainframe computer (16) is continuously updated and made current so that the operator always has the most current customer account information. Also disclosed is a method and an apparatus for processing of incoming calls. Furthermore, a retrofit device is disclosed for use with existing systems.

73 Claims, 9 Drawing Sheets

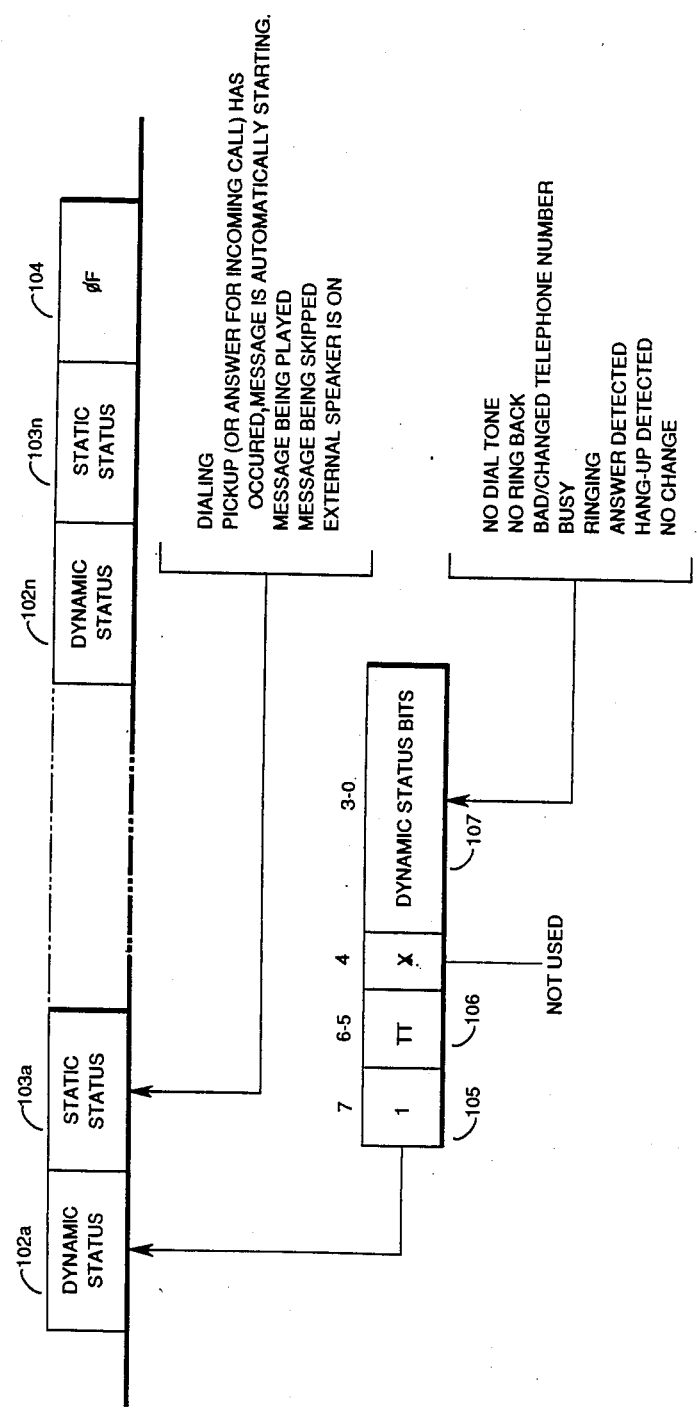

CUSTOMER ACCOUNT ONLINE SERVICING SYSTEM

TECHNICAL FIELD

The present invention relates to customer account servicing systems and particularly provides a method and apparatus for placing outgoing calls, routing incoming calls, and online servicing of customer accounts.

BACKGROUND OF THE INVENTION

Many businesses, especially those with large numbers of customer accounts, periodically contact the customer by telephone to obtain updated account information, remind the customer of a past due account, collect on delinquent accounts, or conduct other business. Also, some businesses are based primarily or exclusively upon sales conducted via telephone, either in response to a previously mailed catalog or advertisement or from direct solicitation by calling the customer. In such businesses the customer account information is typically stored in a mainframe computer and a copy of the customer account information is placed upon a storage medium such as a disk or a tape. This copy is then installed in another computer for access by operators (customer account, sales or service representatives). In some installations the operator sees a telephone number upon the screen and the number is either manually dialed by the operator or dialed by the operator's terminal in response to one or more keystroke inputs by the operator. The operator must then wait to determine if the call is answered, the called number is busy, is out of service or has been changed, or that there is no answer. Therefore, for each call placed, there may be an elapsed time of one to two minutes wherein the operator is looking at the screen, dialing the number or causing the number to be dialed, and waiting for a response from the called number. Therefore, there is need for a method and an apparatus which automatically dials the call without operator intervention or control and only connects the operator and displays the customer account record, which is resident in the mainframe, if the call is answered, thereby allowing the operator's time to be more effectively used.

In businesses which rely primarily or exclusively upon calls from the customer, an operator must answer the call, determine whether the customer desires to place an order, check on the status of an order or obtain account information. The operator must then obtain the account number from the customer, key in the account number of the terminal, and wait for the customer account information to appear on the screen before any business can be transacted. In this case, for each incoming call, there may be several minutes of time wherein the operator is nonproductive or minimally productive, or if all operators are busy, the calling party hears a busy signal or hears repeated ringing but no answer. Therefore, there is a need for a method and an apparatus for obtaining preliminary customer account information from the customer or automatically determining the calling party's telephone number and account information prior to the call being serviced by an operator.

Typically, the customer account information for business transacted is entered on the previously made copy or retained in a separate file. Therefore, at the end of the day or business session, the changes made in the copy must be incorporated into and consolidated with the customer account information in the mainframe system. If several calls are made and/or received regarding the same customer account during the period of a single day then the account information the operator sees at any time may be incorrect since the account information provided to the operator's terminal may be the information resident within the system controller, which has not yet been updated. In this event the operator must, if possible, call up the files containing information on changes made to this account before any business can be correctly transacted. Again, valuable operator time is wasted in obtaining the most current copy of the customer's account information from the mainframe or system controller, and then updating the most current file containing the changes to the customer account. Therefore, there is a need for a method and an apparatus for online or real time updating of the customer account information in the mainframe so that the operator will have immediate access to the current customer account information without having to search between the mainframe file and the changes file, and for maintaining a copy of any changes made to the customer account information and the status of each call so that, in the event of a problem, the call results and any changes can be traced or duplicated.

SUMMARY OF THE INVENTION

The present invention provides a method and apparatus for relieving the operator of the duty of causing the number to be dialed and waiting for an answer, relieves the operator of the duty of obtaining preliminary customer account information, and provides for online, direct updating of the customer account information in the mainframe, thereby eliminating the need for consolidation of changes into the customer account file and thereby providing the operator with the most current information on the customer account.

More particularly described, the present invention provides an apparatus which automatically dials the telephone number of a customer or potential customer, ascertains whether the called number is busy, ringing, no answer, out of service, changed or answered, and, if the call is answered, routes the call to the next available operator and, automatically, obtains the current customer account information from the mainframe and displays, at the operators terminal, the current customer account information.

Also more particularly described, the present invention provides an apparatus which automatically answers incoming calls, queries the customer as to the nature of his call, obtains preliminary information, such as the customer account code and/or the reason for the call from the caller, obtains the current customer account information from the mainframe, routes the incoming call to the next available operator, and provides, at the operator's terminal, the customer account information and the nature of the query.

Also more particularly described, the present invention provides an apparatus which automatically answers incoming calls, obtains the calling party's telephone number from the telephone company central office equipment, retrieves, from the mainframe, the current customer account information corresponding to the calling party's telephone number, routes the call to the next available operator, and provides, at the operator's terminal, the current customer account information retrieved from the mainframe.

Also more particularly described, the present invention provides an apparatus for online updating of customer account information in the mainframe file while maintaining a separate record of all changes made to the customer account and a record of the status of each call made or received.

Therefore, it is an object of the present invention to provide a method and apparatus for immediate and online updating of the customer account information in the mainframe file while also maintaining a separate record of changes made to the customer account and, optionally, the status of each call made or received.

It is another object of the present invention to provide a method and apparatus whereby the operator is relieved of the time consuming and inefficient duty of determining the nature of the customer's call and the preliminary account information.

It is a further object of the present invention to provide a method and apparatus whereby the operator is relieved of the time consuming and inefficient duties of manually dialing the telephone number or causing the telephone number to be dialed and then waiting until the called party answers.

These and other objects of the present invention will be made clear from the detailed description below.

BRIEF DESCRIPTION OF THE DRAWINGS

FIG. 3 is an illustration of a trunk status message.

DETAILED DESCRIPTION

Figure 1:
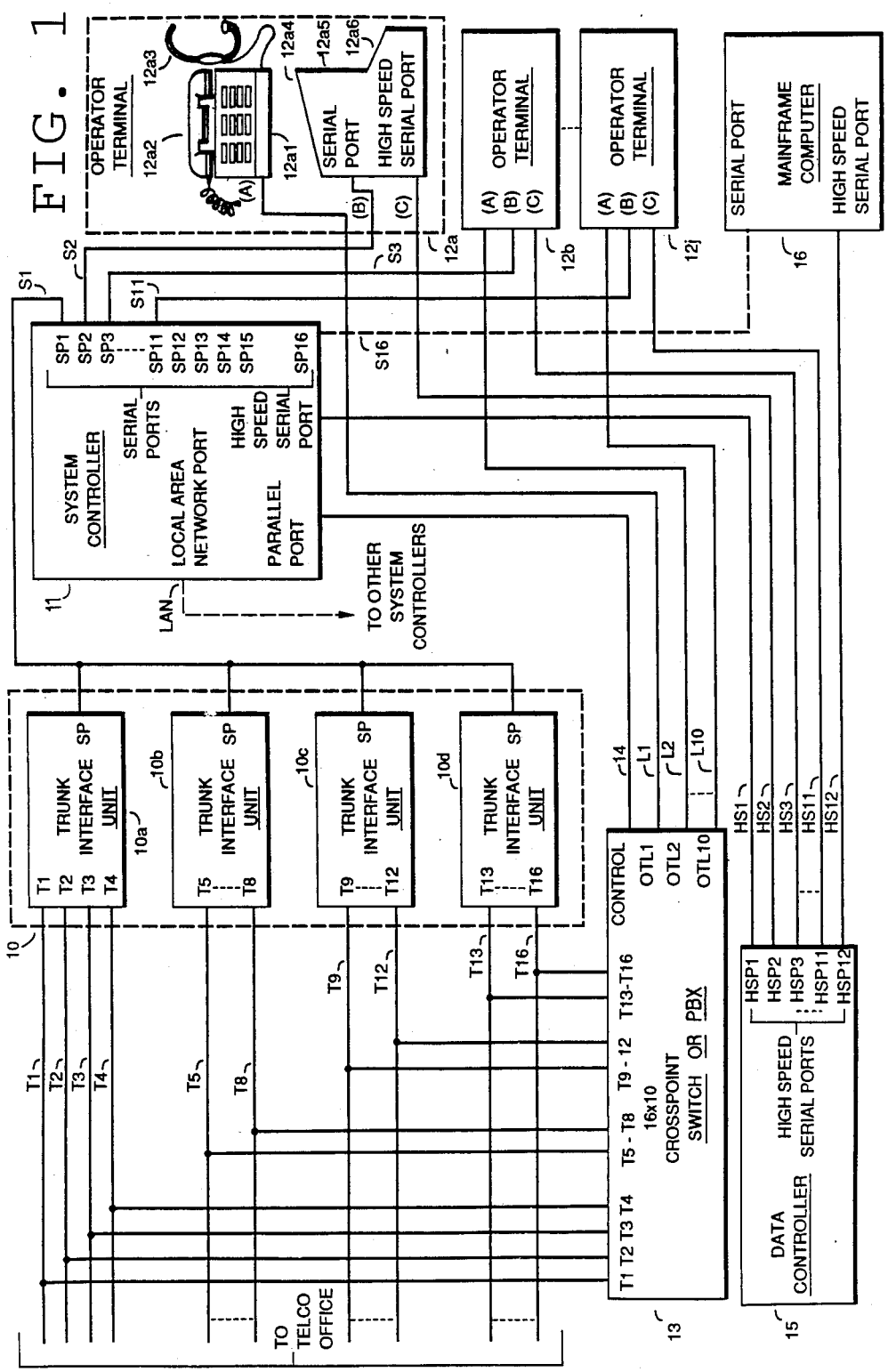
FIG. 1 is a block diagram of the preferred embodiment of the present invention.

Turn now to the drawing in which like numerals represent like components throughout the several figures. FIG. 1 is a block diagram of the preferred embodiment of the present invention in its preferred environment. The preferred embodiment comprises four trunk interface units 10a-10d, a system controller 11, a 16 trunk-by-10 line cross-point switch 13, a data controller 15, a mainframe compute 16, and 10 operator terminals 12a-12j. Sixteen trunk lines T1-T16 are connected to composite trunk interface unit 10 and cross-point switch 13. Each trunk interface unit 10a-10d accommodates four trunk lines so that trunk interface unit 10a services trunks T1-T4, trunk interface unit 10b services trunks T5-T8, and so forth. Each trunk interface unit 10a-10d performs the following functions: trunk seizure; dialing; call progress monitoring; message playing; and message recording. Trunk interface units 10a-10d are explained in more detail below. Switch 13 need not be a cross-point switch but may be another similar device. For example, switch 13 may be, or may be part of, a telephone system, such as the private branch exchange (PBX) switch. In such a case system controller 11 may communicate with the PBX switch 13 via the parallel port shown, or, if desired, through some other communications means, such as serial port SP15. The use of a serial port or a parallel port will, of course, be determined by the nature of the control port of the PBX switch 13. Also, switch 13 is not limited to a 16 by 10 size, but may be larger or smaller, depending upon the number of trunk lines and operator terminals.

In the preferred embodiment, system controller 11 has 16 serial ports SP1-SP16, a parallel port, and a high speed serial port. In the preferred embodiment, serial ports SP1-SP16 are RS-232C serial data ports. Serial port SP1 of system controller 11 is connected to the serial ports (SP) of trunk interface units 10a-10d through a standard multiline drop. Each trunk interface unit 10a-10d has an address different from the other trunk interface units so that system controller 11 may, via port SP1 and trunk interface units 10a-10d, monitor the status of trunk lines T1-T16. System controller 11, via serial port SP1, also commands trunk interface units 10a-10d to perform a desired operation on a specified trunk T1-T16. For example, system controller 11 may command trunk interface unit 10a to seize trunk T1 and being dialing a desired telephone number, command trunk interface unit 10a to begin playing a prerecorded message on trunk T2, and obtain information on the status of the trunks.

In the preferred embodiment, there are 10 operator terminals 12a-12j. Operator terminal 12a, which is representative of operator terminals 12b-12j, has a telephone set 12a1, and a handset 12a2, and/or a headset 12a3. Typically, a headset 12a3, and not handset 12a2, will be plugged into telephone 12a1 so as to free the operator's hands. It will be appreciated that, in environments in which headset 12a3 is always used, handset 12a2 may be eliminated. It will also be appreciated that, if the operator has no need to manually place outgoing calls, telephone set 12a1 may be replaced by a conventional trunk line-to-headset interface.

Operator terminal 12a also has a data terminal 12a4, data terminal 12a4 having a display screen 12a5 and a keyboard 12a6. Data terminal 12a4 preferably has at least two ports: an RS232 C port (B), and a high speed serial port (C). Data terminal 12a4 may also have other types of ports for data transmission and retrieval, such as a telephone port for use by an internal modem. In the preferred embodiment, data terminal 12a4 is an IBM-PC or compatible computer equipped with a type IBM 3278 or 3279 emulator, which provides high speed serial port (C) by means of a coaxial connector (not shown).

Serial ports SP2-SP11 of system controller 11 are connected by RS232 C buses S2-S11, respectively, to the serial port (B) of operator terminals 12a-12j, respectively. Line outputs OTL1-OTL10 of cross-point switch 13 are connected by telephone lines L1-L10, respectively, to the telephone inputs (A) of operator terminals 12a-12j, respectively.

In the preferred embodiment, system controller 11 is an IBM-AT or compatible computer having a 3278 or 3279 emulator, which provides the high speed serial port over a coaxial connector (not shown), and two 8-channel multiple RS232 C boards, which provides serial ports SP1-SP16.

Data controller 15 is a type IBM 3274 controller using the IBM 3270 communications protocol. Data controller 15 has 12 high speed serial ports, HSP1-HSP12, which are also provided over coaxial connectors (not shown). The HSP1 port of data controller 15 is connected by coaxial cable HS1 to the high speed serial port of system controller 11. Ports HSP1-HSP11 of data controller 15 are connected by coaxial cables HS2–HS11, respectively, to the high speed serial ports (C) of operator terminals 12a–12j, respectively.

In the preferred embodiment, mainframe computer 16 is an IBM type 3084 or 3091 mainframe computer. In the preferred embodiment, mainframe computer 16 has one or more disk drive systems (not shown) which contain the customer account information. Mainframe computer 16 has at least one high speed serial port provided by coaxial connector (not shown), which is connected to port HSP12 of data controller 15 by coaxial cable HS12.

Consider now the operation of the preferred embodiment. Mainframe computer 16 will provide, by a batch transfer or online transfer, the customer account information for a desired number of accounts to data controller 15. Data controller 15 then provides this information via port HPS1 to system controller 11. Alternatively, system controller 11 may obtain this information directly from mainframe 16 and its associated disk drive systems. System controller 11 then extracts, for each account, the name of the customer, the customer's telephone number, the account number, and/or some type of mainframe database index number. Assuming that trunk T1 is available, then system controller 11 will direct trunk interface unit 10a to seize trunk T1, provide the customers telephone number to trunk interface unit 10a, and direct trunk interface unit 10a to dial the customer's telephone number. Trunk interface unit 10a dials the customer's telephone number and then monitors trunk T1 for the status of the call. If trunk interface unit 10a dvises, via port SP, system controller 11 that the called number is busy, or is not answered, system controller 11 will mark, in its memory (not shown), the account accordingly and place the account in the queue to be tried again later. It will be appreciated that the memory associated with system controller 11 may be a semiconductor memory, such as RAM, or a disk memory system.

Figure 2:
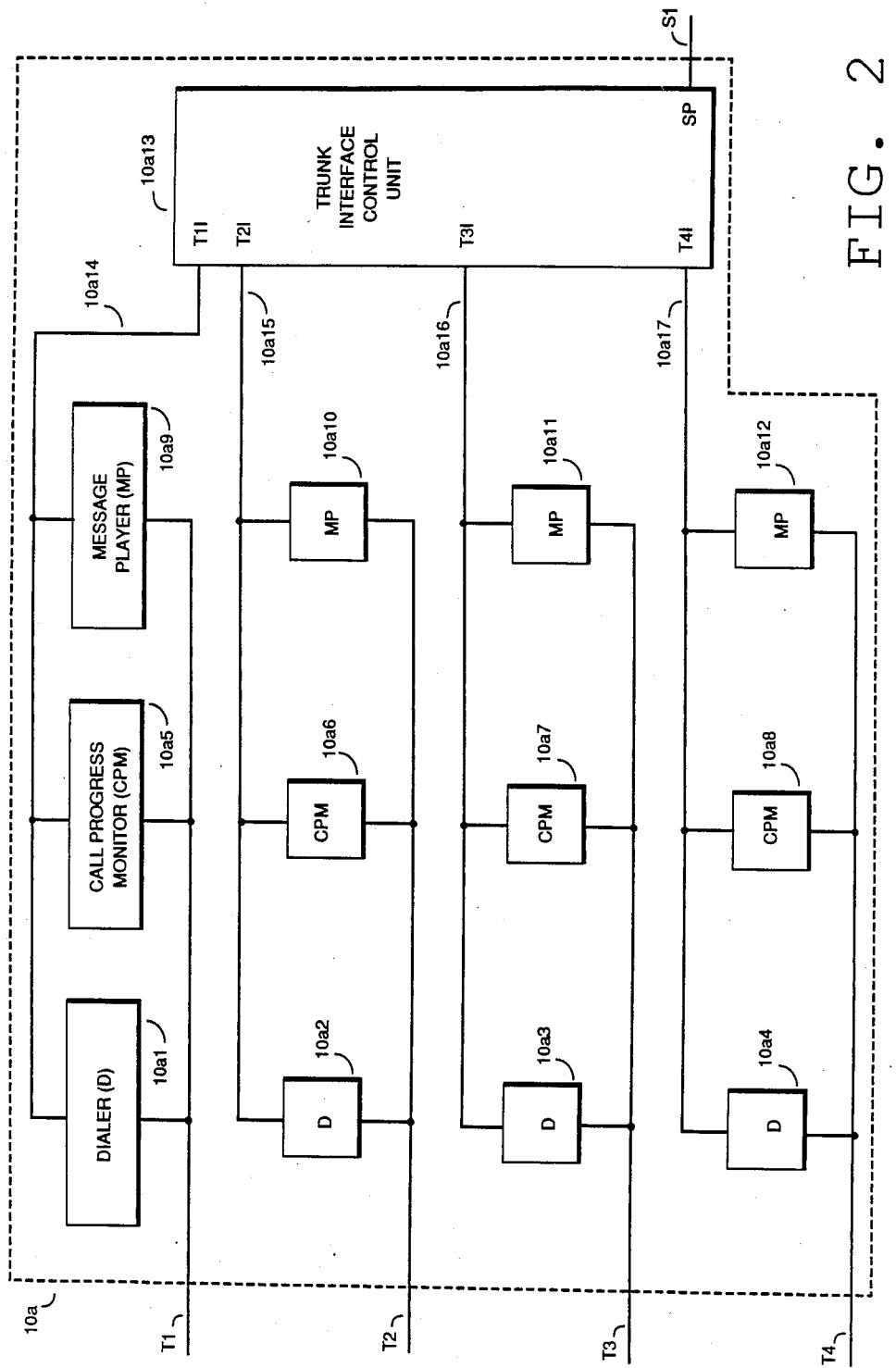
FIG. 2 is a block diagram of a trunk interface unit.

Assume now that the customer answers the call. Trunk interface unit 10a will automatically start a message player (FIG. 2) and advise system controller 11 that the call has been answered. If an operator is available, system controller 11 will send the abbreviated information (telephone number, customer name, account number, and/or database index number), to, for example, operator terminal 12a over bus S2, direct cross-point switch 13, via bus 14, to connect trunk T1 to telephone 12a1 via line port OTL1, and then direct trunk interface unit 10a to release trunk T1 and stop the message player (FIG. 2). The message player will then stop the message currently being played and position itself at the beginning of the next message. Terminal 12a4 will display the abbreviated information on screen 12a5. Therefore, as soon as the operator at operator terminal 12a is connected with the customer on trunk T1, the operator has at least the abbreviated customer account information. If terminal 12a4 is a semi-smart terminal then the operator may obtain the full account information by pressing one or more keys on keypad 12a6 which causes terminal 12a4 to request the full account information, via bus HS2 and data controller 15, from mainframe 16. Alternatively, if terminal 12a4 is a semi-smart terminal, then system controller 11, via bus HS1 and data controller 15, may instruct mainframe 16 to send the full account information to terminal 12a4 for display on screen 12a5.

If terminal 12a4 is a smart terminals then, upon receiving the abbreviated account information from system controller 11, terminal 12a4 may, without prompting from the operator immediately request the full account information from mainframe 16 through data controller 15. The result is that, with minimal or no effort by the operator, the customer has been called, the customer's answer has been detected, the operator has been connected to the customer, and the operator sees and can manipulate, on screen 12a5, the most current customer account information. Therefore, the operator has not had to perform the inefficient and time consuming duties of requesting a telephone number, obtaining a trunk line, dialing the number, waiting for the party to answer, and obtaining current information on the customer account.

Once connected, the operator can then discuss the matter or reason for which the customer was called, for example, discussing a late payment account, collecting on a delinquent account, verifying an order, updating customer account information, etc., while being directly connected, online, to mainframe 16.

Assume now that when the party called on trunk T1 answered, an operator was not available. Trunk interface unit 10a starts the message player and advises system controller 11 that the called party has answered. After ascertaining that an operator is not available, system controller 11 will allow trunk interface unit 10a to continue playing the desired prerecorded message to the called party. As soon as system controller 11 determines that an operator is available, system controller 11 will cause cross-point switch 13 to connect the available operator terminal 12 to trunk T1, direct trunk interface unit 10a to release trunk T1, direct unit 10a to stop the message, advance to the next message, and send the abbreviated customer account information to the available operator terminal 12. Again, the operator will have the customer account information when the customer is connected and can then begin to discuss the reason for which the customer has been called.

In the preferred embodiment, when the operator at operator terminal 12a has concluded the business with the customer the operator may press a telephone trunk release key on keyboard 12a6 to indicate that trunk T1 should be released. Terminal 12a4 sends the trunk release signal over serial port B to system controller 11. System controller 11 then directs crosspoint switch 13 to disconnect telephone 12a1 from trunk T1. System controller 11 then sends the next telephone number to trunk interface unit 10a and directs trunk interface unit 10a to seize trunk T1 and dial this next telephone number.

When the operator at operator terminal 12a has completed entering any new data for the particular customer account then the operator at terminal 12a may press a terminal release key on keyboard 12a6. Terminal 12a4 sends this information to system controller 11 which advises system controller 11 that the operator at operator terminal 12a is available for the next call. System controller 11 then causes crosspoint switch 13 to connect the next customer to telephone 12a1 and sends the abbreviated customer account information to terminal 12a4 for display on screen 12a5. Therefore, as soon as the operator at operator terminal 12a has indicated that processing of one customer account is completed system controller 11 connects the operator with the next called party. The result is that the operator's time is more efficiently and more completely utilized.

Alternatively, a single key or single entry on keyboard 12a6 may indicate to system controller 11 that the connected trunk should be released and that the operator is available for the next customer.

All entries made by the operator via keyboard 12a6 are sent by terminal 12a4 to system controller 11 and, in the online mode, to data controller 15. In the preferred embodiment, system controller 11 maintains statistics on the number and type of entries, the connection time, etc. Data controller 15 sends the changes over high speed serial port HSP12 to mainframe computer 16 whereupon mainframe computer 16 updates the customer account information in the main database. Therefore, the customer account information contained in mainframe 16, and available to the operators is the most current information.

From the above, it will be appreciated that the present invention relieves the operator of the inefficient and time consuming duties of obtaining the telephone number, dialing the telephone number, and waiting for the called customer to answer. Also, it will be appreciated that the customer account information in the main database in mainframe computer 16 is immediately updated so that, at the end of the business day, it is not necessary to consolidate changes made by the operator(s) to the customer account information and also provides the benefit that, at any time during the day when the customer calls or is called, the customer account information available to the operator is the current, updated customer account information.

It will also be appreciated that the operation of system controller 11 and data controller 15 are transparent to the operator. System controller 11 automatically processes each call and routes the call to the first available operator, and data controller 15 provides a direct link to mainframe 16. Therefore, any changes to the customer account information made by the operator are immediately provided to mainframe 16, which automatically and instantly updates the customer account information. Furthermore, because of the automatic updating, any information provided to an operator is the most current information. The operator therefore appears to be directly connected to mainframe 16.

Although, in the preferred embodiment, system controller 11 sends only the abbreviated customer account information to an operator terminal 12, if system controller 11 has sufficient memory capacity, system controller 11 may retain the entire file for a customer account and send this entire record to the operator terminal, thereby eliminating the steps of sending the abbreviated account information to the operator terminal, sending the account number, telephone number, and/or database number to mainframe 16 via data controller 156, and then sending the full account information from mainframe 16 to the operator terminal via data controller 15.

FIG. 1 also discloses two other embodiments of the present invention. In one embodiment, system controller 11 has a local area network port and is connected to other system controllers (not shown) by bus LAN. This is particularly useful in large systems where a single system controller 11 cannot accommodate the number of trunks and/or operator terminals used. In another embodiment, the SP16 serial port of system controller 11 is connected by bus S16 to a serial port of mainframe 16. This allows system controller 11 to communicate directly with mainframe 16, as opposed to going through data controller 15. This connection is useful where data controller 15 is not used and/or mainframe 16 does not have an available high speed port.

Turn now to FIG. 2 which is a block diagram of an exemplary trunk interface unit 10a. Trunk interface unit 10a contains four dialers (D) 10a1–10a4, four call progress monitors (CPM) 10a5–10a8, four message players (MP) 10a9–10a12, and a trunk interface control unit 10a13. Dialer 10a1, call progress monitor 10a5, and message player 10a9 are connected to trunk T1. Similarly, dialers 10a2–10a4, call progress monitors 10a6-10a8, and message players 10a10–10a12 are connected to trunks T2–T4, respectively. A dialer, such as dialer 10a1, can be directed by trunk interface control unit 10a13 to seize trunk T1, dial a number on trunk T1, hold trunk T1, and release trunk T1. A call progress monitor, such as monitor 10a5, reports the status of the signals on trunk T1, such as ringing, answered, busy, no ring back, no dial tone, and bad or disconnected telephone number (three tone intercept). A message player, such as message player 10a9, can be directed to hold trunk T1 by providing a DC path for trunk T1, play one or more prerecorded messages on trunk T1 and release trunk T1. An example of a call progress monitor is that described in U.S. Pat. No. 4,477,698, dated Oct. 16, 1984, by Aleksander Szlam and Chester P. Quinn, entitled "Apparatus for Detecting Pick-Up at a Remote Telephone Set", which is assigned to the assignee of the present invention and which is hereby incorporated herein by reference. The construction and operation of dialers and message players are now well known to those skilled in the art. A system containing a dialer and message player is disclosed in U.S. patent application No. 752,053, filed July 5, 1985", by Aleksander Szlam, entitled "Telephone Answering and Call Forwarding Improvement", now U.S. Pat. No. 4,677,663, issued June 30, 1987, which is also assigned to the assignee of the present invention, and which is hereby incorporated herein by reference.

Dialer 10a1, call progress monitor 10a5, and message player 10a9 are controlled by trunk interface control unit 10a13 via its trunk 1 interface port (T1I) via bus 10a14. Dialers 10a2–10a4, call progress monitors 10a6–10a8, and message players 10a10–10a12 are also controlled by trunk interface control unit 10a13 by its T2I, T3I, and T4I ports, respectively, via buses 10a15–10a17, respectively. The serial port (SP) of trunk interface control unit 10a13 is connected to bus S1. It will be recalled that bus S1 is used by composite trunk interface unit 10 to transfer data and control information to/from system controller 11. In the preferred embodiment, each trunk interface unit 10a–10d has a different address which is stored in trunk interface control unit 10a13. System controller 11 can therefore selectively address a desired one of the trunk interface units 10a–10d. Trunk interface control unit 10a13 provides the interface between the individual dialers, call progress monitors, and message players and the system controller 11. After addressing trunk interface control unit 10a13, system controller 11 may, for example, direct trunk interface control unit 10a13 to activate dialer 10a1, provide status information obtained from call progress monitor 10a6, and start or continue playing messages on message players 10a11 and 10a12. Trunk information control unit 10a13 executes commands from system controller 11 which are addressed to it. Furthermore, in the preferred embodiment, trunk interface control unit 10a13 provides status information to system controller 11 only when trunk interface control unit 10a13 is addressed and polled by system controller 11. Means of construction of a trunk interface control unit, such as unit 10a13, will be apparent to those skilled in the art from a reading of the operation of unit 10a13 contained herein.

A trunk interface unit, such as unit 10a13, provides trunk status information to system controller 11. FIG. 3 is an illustration of the preferred form of the trunk status message. Each message has a series (N) of pairs of dynamic status bytes 102a-102n and static status bytes 103a-103n, and a termination, which in the preferred embodiment, is the ASCHII shift in character OF (hex).

A typical dynamic status byte 102a has a leading logic 1 for the most significant bit 105, the address TT of the trunk being reported in the trunk address field 106 (bits 5 and 6), and a dynamic status field 107 (bits 0-3). Bit 4 is not currently used. The dynamic status conditions reported are: no dial tone, no ringback, bad/changed telephone number, busy, ringing, answer detected, hang-up detected, and no change.

A static status byte 103 always follows a dynamic status byte 102 and indicates the following conditions: pickup (or answer for an incoming call) has occured and message is automatically starting, message is being played, message is being skipped (for tape-type message players), dialing, and external speaker (or speakerphone) is on.

The status of a trunk line is reported only if there has been a change in the dynamic status and/or the static status since the last report for that trunk line. When the status is reported, the dynamic status byte 102 identifies the trunk line being reported for that byte and for the immediately following byte, which is the static status byte. Note that if the only change is in the static condition, the dynamic status will be reported as "no change" (1TTX0000). Trunk interface control unit 10a13 automatically clears the dynamic status after each status report.

If there is no change in the status of any of the trunks, the trunk interface control unit sends a single byte message, the ASCII carriage return ("CR") character, 0D (hex).

Figure 4A:
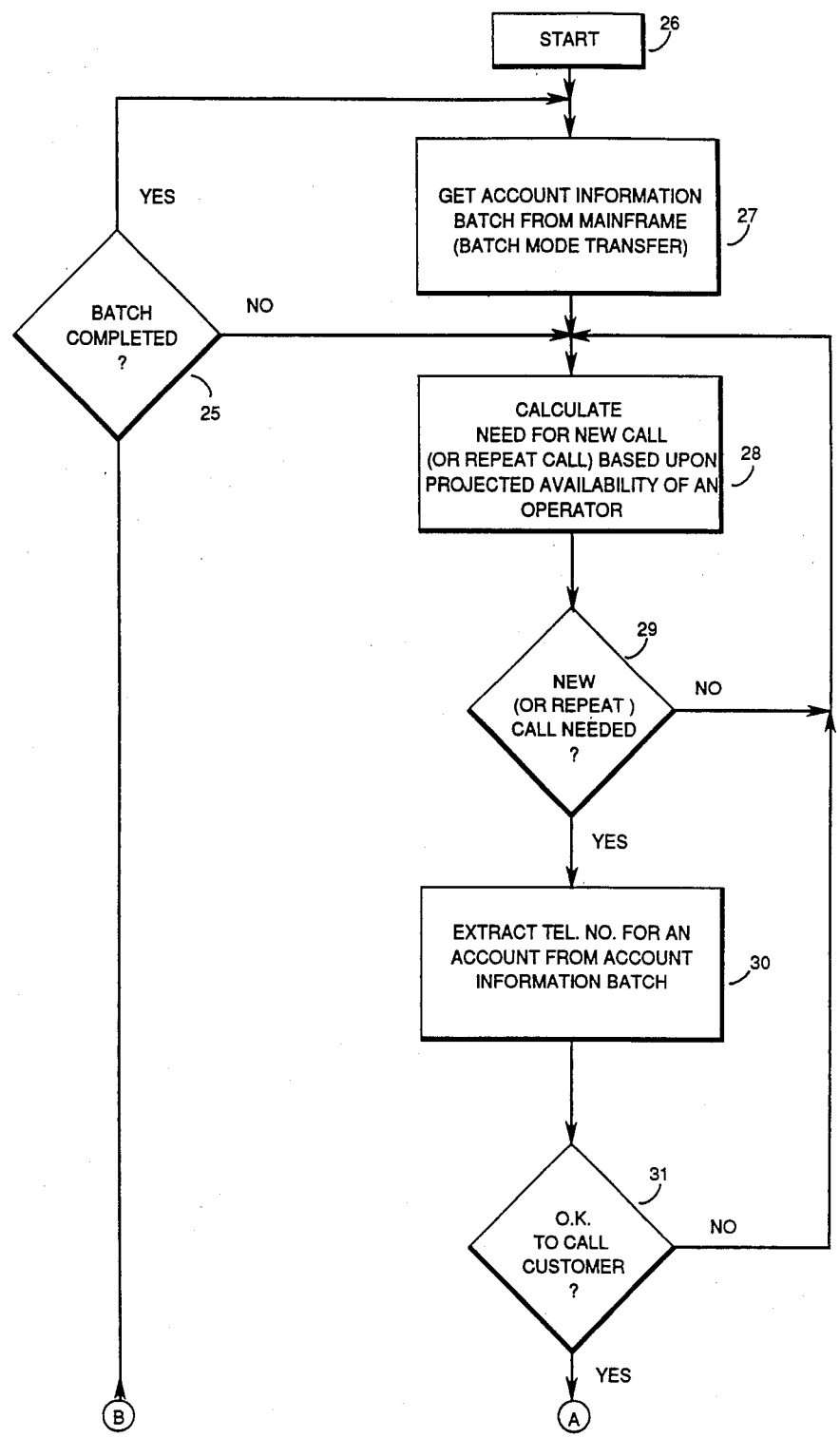
FIGS. 4A and 4B are a flow chart of the system controller logic.
Figure 4B:
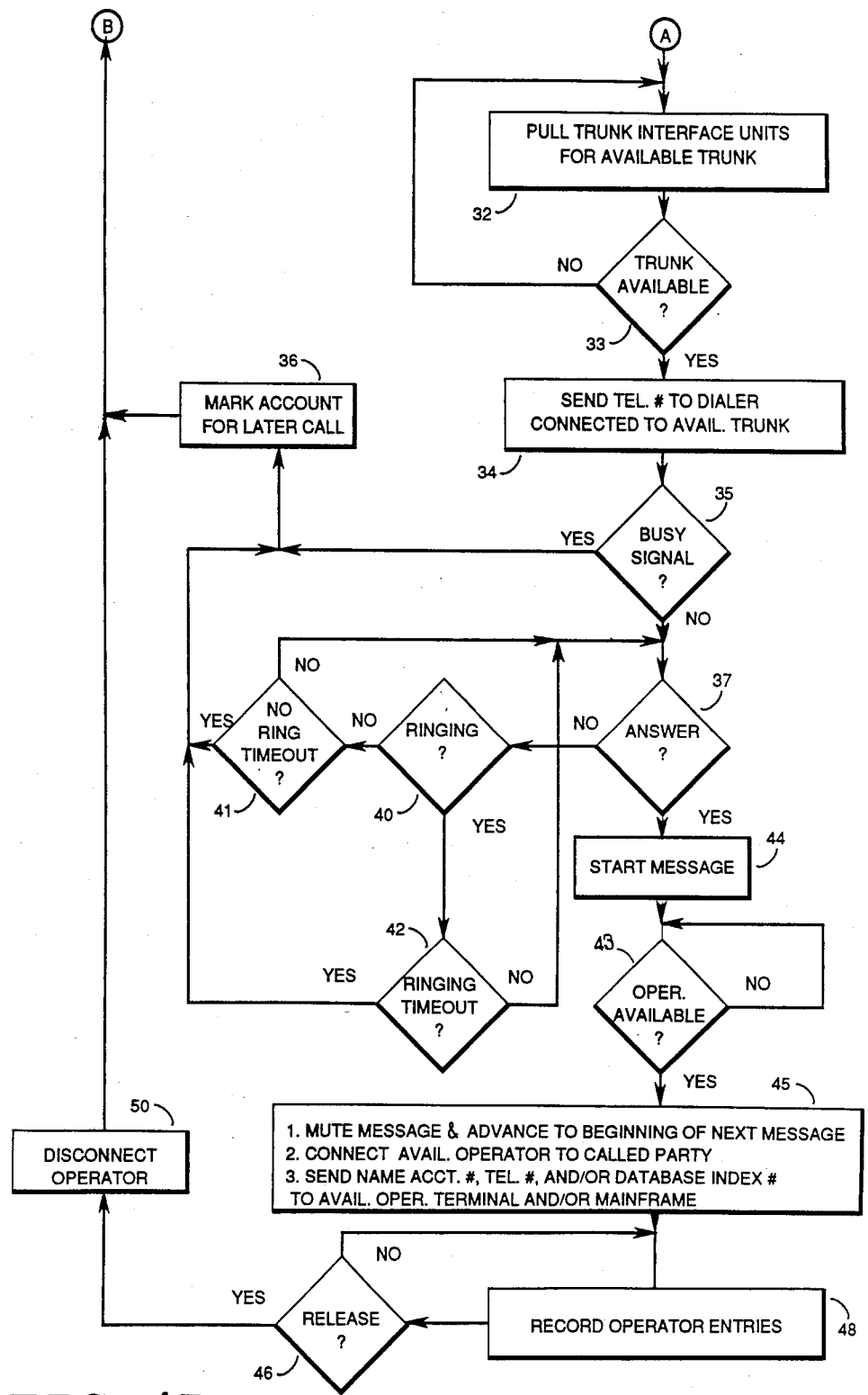

Turn now to FIGS. 4A and 4B which are a flow chart of the logic used by system controller 11. Upon starting 26, the first step 27 is to obtain, by batch mode transfer from mainframe 16, the account information for a number of customers. This account information may also contain a mainframe database index number or key. Alternatively, system controller 11 may obtain, for a number of accounts, abbreviated account information such as name, telephone number, account number and/or an index number. Batch mode transfer is preferred but, if desired, system controller 11 can obtain information on a single customer account from mainframe 16. The next step 28 is to calculate the need for a new call (or a repeat call) based upon the projected availability of an operator. If an operator is available, then there would be a need for a new call (or a repeat call). However, if all the operators are busy, then, based upon the statistical probability of an operator becoming available within a predetermined time, a new call may or may not be needed. Decision 29 tests whether a new (or repeat) call is needed. If not, then system controller 11 returns to step 28. If so, then system controller 11 proceeds to step 30 wherein it extracts the telephone number for the next account to be called. Decision 31 tests whether it is permissible to dial the extracted telephone number based upon several factors. Typically, the several factors would include the time zone in which the party is located, whether the telephone number was previously called, whether the telephone number previously called was busy, not answered or out of service, the amount of time since the last attempt to contact that telephone number information on whether the account should be called during daytime hours, nighttime hours, or only during certain hours, and the priority desired (larger bills called first). If it is not permissible to dial this telephone number, based upon these factors, then system controller 11 returns to step 28. If it is permissible to dial this telephone number, then system controller 11 proceeds to step 32.

It will be appreciated that, since system controller 11 obtains account information for a batch of customer accounts at step 27, the account information contained in system controller 11 may, because of subsequent incoming calls and/or payments and credits to the bill, no longer be current by the time a particular customer account reaches its turn in the queue. There are several different approaches to handling this problem. One approach is for system controller 11 to obtain account information for only one account at a time at step 27. Another approach is, each time information is entered into mainframe 16, for mainframe 16 to send to system controller 11 updated information on that account. Another approach, which is used in the preferred embodiment, is for system controller 11 to request the status of each account from mainframe 16 before system controller 11 attempts to place a call for that account. Mainframe 16 would then advise system controller 11 if there has been a change in the status for that account and, if a change has been made, what change to the status has occurred. If there has been no change in the status or, if the change does not affect the need to call that particular account, then system controller 11 will proceed to step 32. If it is no longer appropriate to call that account, then system controller 11 will return to step 28.

The next step 32 is to poll the trunk interface units 10 for an available trunk T. If a trunk T is not available the step 32 and decision 33 are repeated until a trunk T becomes available. When a trunk becomes available the next step 34 is to send the telephone number to the dialer connected to the trunk T which has been determined to be available. If, at decision 35, a busy signal is detected on the trunk T then the account is marked 36 to be called again later. If a busy signal is not present then decision 37 tests whether the trunk T has been answered. If not then decision 40 tests whether there is a ringing signal present on the trunk T. If a ringing signal is not present then decision 41 determines whether a "no ring time-out" has occurred. If so then step 36 is executed. If not the decision 37 is tested again. If, at decision 40, a ringing signal is present the next decision 42 is whether a "ringing timeout" has occured. If so then step 36 is executed. If not then decision 37 is executed.

If, at decision 37, an answer has been detected the message player starts automatically 44, or at the direction of system controller 11. The next decision 43 is to determine whether an operator is available. If not the message player connected to the trunk is allowed to continue playing and decision 43 is exacted again. Once an operator becomes available then, at step 45, the message player is muted and advanced to the beginning of the next message, the available operator is connected to the called party, and the name, account number, telephone number and/or database index number of the called party is sent to the operator terminal of the available operator and/or to mainframe 16. The operator terminal, in turn, sends via its high speed serial port and data controller 15, the telephone number, account number, and/or database index number, to mainframe 16. Mainframe 16 sends, via data controller 15, the full customer account information to the operator terminal. The operator terminal then overlays, on its screen, the full customer account information over the abbreviated customer account information previously provided by system controller 11. The operator can then conduct the necessary business with the customer and enter any desired or necessary changes via the keyboard. All operator entries are sent from the operator terminal, via data controller 15, to mainframe 16. Each entry is then used by mainframe 16 to immediately update the customer account information resident in mainframe 16. Therefore, the customer account information in mainframe 16 is updated online and is always current. In the preferred embodiment, the operator may direct that some entries be sent by the operator terminal to system controller 11 which then, under the control of the operator, temporarily or permanently maintains 48 a record of these entries. The entries can be directed toward either system controller 11 or mainframe 16 by simply toggling a direction key on the keyboard prior to making the entries. System controller 11 also maintains a record of each call such as time of call, length of call, busy, no answer, etc.

Decision 46 tests whether the operator has pressed the release key or other transaction termination key on the keyboard. If not then step 46 is executed again. If a release is detected at decision 46, then the next step 50 is to disconnect the operator from the trunk T. From steps 36 and 50 system controller 11 proceeds to decision 25. Decision 25 tests whether system controller 11 is completed, or almost completed, processing of the accounts received in step 27. If not, then system controller 11 proceeds to step 28. If so, then system controller 11 proceeds to step 27 for the next batch transfer.

It will be appreciated that the diagram of FIG. 4 is a simplified flow chart since system controller 11 is simultaneously handling the control of 16 trunks T and 10 operator terminals 12. Therefore, for clarity, the flow chart of FIG. 4 illustrates the typical sequence for handling a single account. Also, other changes in the flow chart may be desirable depending upon the functions performed by trunk interface unit 10 and system controller 11. For example, a trunk interface unit 10 could be constructed or programmed to begin playing the message only in response to an instruction from system controller 11.

Figure 5:
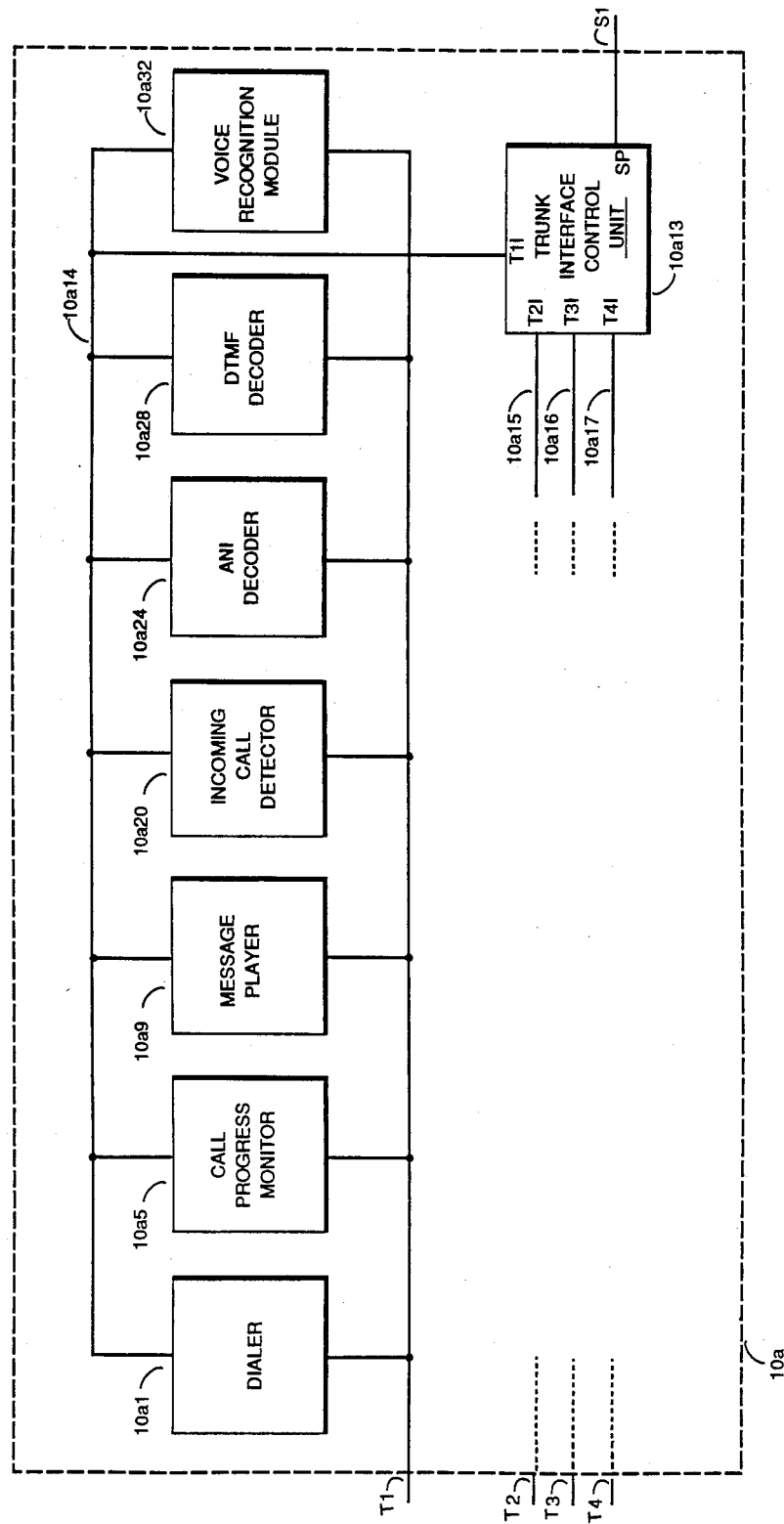
FIG. 5 is a block diagram of an alternative trunk interface unit.

The present invention is not limited to application for outgoing calls but is also applicable to incoming calls, or both. The ability to handle incoming calls as well as outgoing calls is determined by the structure of composite trunk interface unit 10 and programming for system controller 11. Turn now to FIG. 5 which is a block diagram of a typical trunk interface unit 10a constructed to handle both incoming and outgoing calls. The trunk interface unit 10a preferably contains a dialer 10a1, a call progress monitor 10a5, a message player 10a9, an incoming call detector 10a20, an automatic number identification (ANI) decoder 10a24, a dual tone multiple frequency (DTMF) decoder 10a28, and a voice recognition module 10a32 for each trunk T1-T4. Dialer 10a1, call progress monitor 10a5, message player 10a9, incoming call detector 10a20, ANI decoder 10a24, DTMF decoder 10a28, and voice recognition module 10a32 are all connected to trunk T1. Likewise, dialer 10a1, call progress monitor 10a5, message player 10a9, incoming call detector 10a20, ANI decoder 10a24, DTMF decoder 10a28, and voice recognition module 10a32 are all connected by bus 10a14 to the T1I port of trunk interface control unit 10a13. The function of dialer 10a1, call progress monitor 10a5, and message player 10a9 have been previously described, Incoming call detector 10a20 monitors trunk T1 and advises trunk interface control unit 10a13 when an incoming ringing signal appears on trunk T1. In the preferred embodiment, trunk interface control unit 10a13 will report an incoming call on trunk T1 to system controller 11 in the static status byte for trunk T1. Upon detecting an incoming call on trunk T1 trunk interface control unit 10a13 may direct ANI decoder 10a24 to obtain the telephone of the calling party, and direct message player 10a9 to seize the line and begin playing the prerecorded message or, alternatively, system controller 11 may instruct trunk interface control unit 10a13 to direct ANI decoder 10a24 and message player 10a9 to perform these functions. The message played by message player 10a9 may be a simple message advising the party that an operator will be connected as soon as one becomes available or, in conjunction with DTMF decoder 10a28, may query the customer for more information such as the customer's telephone number and/or account number. This is explained in more detail below.

Furthermore in some areas of the country, the local telephone office provides a service sometimes called automatic number identification (ANI). In areas where ANI is available, the central office will provide, over the trunk, tone or other signals which can be decoded to yield the number from which the calling party is calling. In this case, a decoder, such as ANI decoder 10a24 would provide the calling party's telephone number to trunk interface control unit 10a13. Trunk interface control unit 10a13 would then provide the calling party telephone number to system controller 11. System controller 11 via data controller 15 requests mainframe 16 to provide the customer account information based upon the calling party telephone number. If the calling party telephone number does not correspond to the telephone number for an existing client then, when an operator becomes available, system controller 11 will connect the callin party to the available operator and also provide the calling party telephone number to the operator terminal for manual input. The operator can then conduct business with the calling party, obtain other information from the calling party, such as a name and/or an account number, enter this information via the keyboard to obtain the customer account information from mainframe 16, establish an account for a new customer etc.

However, if the calling party telephone number corresponds to the telephone number of an existing client in the database, then mainframe computer 16 will provide this information either to system controller 11 via data controller 15 or to the next available operator terminal. When an operator becomes available, system controller 11 will provide the abbreviated customer account information to the available operator terminal. The operator terminal will then, as previously described, obtain the full customer account information from mainframe 16. The operator can then conduct the necessary business with the customer.

DTMF decoder 10a28 allows the customer to provide certain information via the DTMF keypad on his telephone set. For example, assume that ANI service is not available in the area. Upon being advised of an incoming call, trunk interface control unit 10a13 or system controller 11 will cause message player 10a9 to seize the line and begin playing the first prerecorded message. The first prerecorded message may be, for example, a message asking the calling party to key in the DTMF digit 1 if the calling party has an established account and the digit 2 if the calling party does not have an established account. Other prerecorded messages on message player 10a9 may query the customer and ask for an appropriate DTMF keypad in response as to whether the customer wishes to open a new account, change an existing account, place, change or cancel an order, etc. Therefore, message player 10a9 may contain more than one message, the particular message to be played determined by the numbers which the calling keyed in over his DTMF keypad. Also, a message on message player 10a9 may ask the calling party to key in his telephone number and/or account number. This information would then be provided via trunk interface control unit 10a13 to system controller 11. When an operator becomes available, system controller 11 sends the information collected to the operator terminal for display upon the screen. Then, either automatically or in response to an operator keystroke, the operator terminal sends the collected information to mainframe 16. Mainframe 16 then provides the full customer account information to the operator terminal.

Therefore, for incoming calls, the operator has been relieved of the time consuming and inefficient duties of answering the call, ascertaining the customer's account number and keying in the customer's account number. For established clients, the operator has the customer account information on screen immediately upon being connected to the calling party. Furthermore, where the orders are placed, changed or cancelled by the calling party's use of the DTMF keypad it may not be necessary for the operator to intervene at all or, in the alternative, the operator may simply be connected in order to verbally verify the information provided by the calling party.

System controller 11 is capable of automatic call distribution (ACD) routing of calls. Also, if different operators handle different types of calls, such as incoming calls, outgoing calls, establish new account, place or change an order, contact regarding a delinquent account, etc., system controller 11 automatically routes the incoming or outgoing call to the next available operator which handles that particular type of call. Therefore, the order and/or selection of which operator is connected to a particular call is controlled by system controller 11 on an ACD basis.

Voice recognition module 10a32 allows some transactions to be completely handled without operator intervention and without requiring the customers to have a DTMF-type telephone. In the preferred embodiment, module 10a32 is the TeleRec system, manufactured by Voice Control Systems, Dallas, Tex. Details of operation of the TeleRec system are available from the manufacturer upon request. Module 10a32 provides digital output signals corresponding to a predetermined vocabulary, such as the spoken words one through nine, zero (oh), yes, no, help, cancel, and terminate. The TeleRec system also decodes DTMF tones and eliminates the need for a separate DTMF decoder 10a28.

When module 10a32 is used, instead of immediately routing an incoming call or an answered outgoing call to an operator at an operator terminal 12a, the initial contact is handled by system controller 11.

When an incoming call or an outgoing call is answered trunk interface control unit 10a13 will cause message player 10a9 to begin playing the first prerecorded message. This prerecorded message contains instructions for the customer to speak the appropriate word, or words, at the end of the message, to indicate the customer's response to the message. The response elicited may be, for example, an account number, a telephone number, a "yes" or a "no", etc. Module 10a32 decodes the customer's response and provides this response to system controller 11. Based upon the customer's response, system controller 11 may cause message player 10a9 to play an appropriate next message, disconnect trunk T1, or connect an available operator and provide the customer's responses to the operator's terminal for display on the screen.

The particular messages played, and the customer's response, such as placing an order, changing an order, etc., are then stored by system controller 11 and/or mainframe 16. The customer's responses are also used to immediately update the customer account information in mainframe 16. Therefore, certain types of transactions can be handled without the intervention of an operator, thereby reducing the number of operators required and/or more efficiently utilizing the operators. Also, since both DTMF tones and spoken words can be recognized and acted upon, the use of module 10a32 allows transactions to be automatically conducted both with customers who have DTMF telephones and with customers who have rotary dial (pulse) telephones.

It will be appreciated that control of the call and monitoring of the customer's response need not be done solely by system controller 11 but may also be performed, wholly or partly, by an operator at a data terminal 12. In such an arrangement, system controller 11 would function as a conduit, passing information from trunk interface unit 10a13 to data terminal 12a, and control instructions from data terminal 12a to trunk interface unit 10a13, monitoring the status of the call, and disconnecting trunk T1 upon termination of the call.

It will also be appreciated that, in a typical environment, the message played to customer will be substantially longer than the customer's response (yes, no, cancel, etc.) to the message. Therefore, a voice recognition module, such as 10a32, could be switched, or multiplexed, between several trunks, instead of being dedicated to a single trunk.

The construction of incoming call detector 10a20 is now well known to those skilled in the art and is also described in U.S. Pat. No. 4,677,663, referenced above. Likewise, DTMF decoder 10a28 is commercially available as an off the shelf item. The use of an DTMF decoder is also described in U.S. Pat. No. 4,677,663, referenced above. ANI decoder 10a24 may be constructed in the same manner as DTMF decoder 10a28, provided that the different tones used in ANI are accounted for. Although not shown, it will be understood that a similar array of devices is also connected to trunks T2-T4, and that trunk interface control unit 10a13 controls this array of similar devices via its T2I-T4I ports over buses 10a15-10a17, respectively.

It will be appreciated that the devices connected to a trunk used only for outgoing calls need not have an incoming call detector, an ANI decoder, or a DTMF decoder. Likewise, for a trunk which handles only incoming calls, dialer 10a1 and call progress monitor 10a5 are not required. Furthermore, in areas where ANI is not available then there will be no need for an ANI decoder.

It will now be appreciated that the present invention increases the efficiency of the operator by relieving the operator of time consuming and inefficient duties associated with placing outgoing calls and answering incoming calls as well as obtaining a uniform operator work load by distributing calls on an ACD basis, as directed by system controller 11, while providing online updating of the customer account information resident in mainframe 16 so that the most current information is always provided to the operator.

Figure 6:
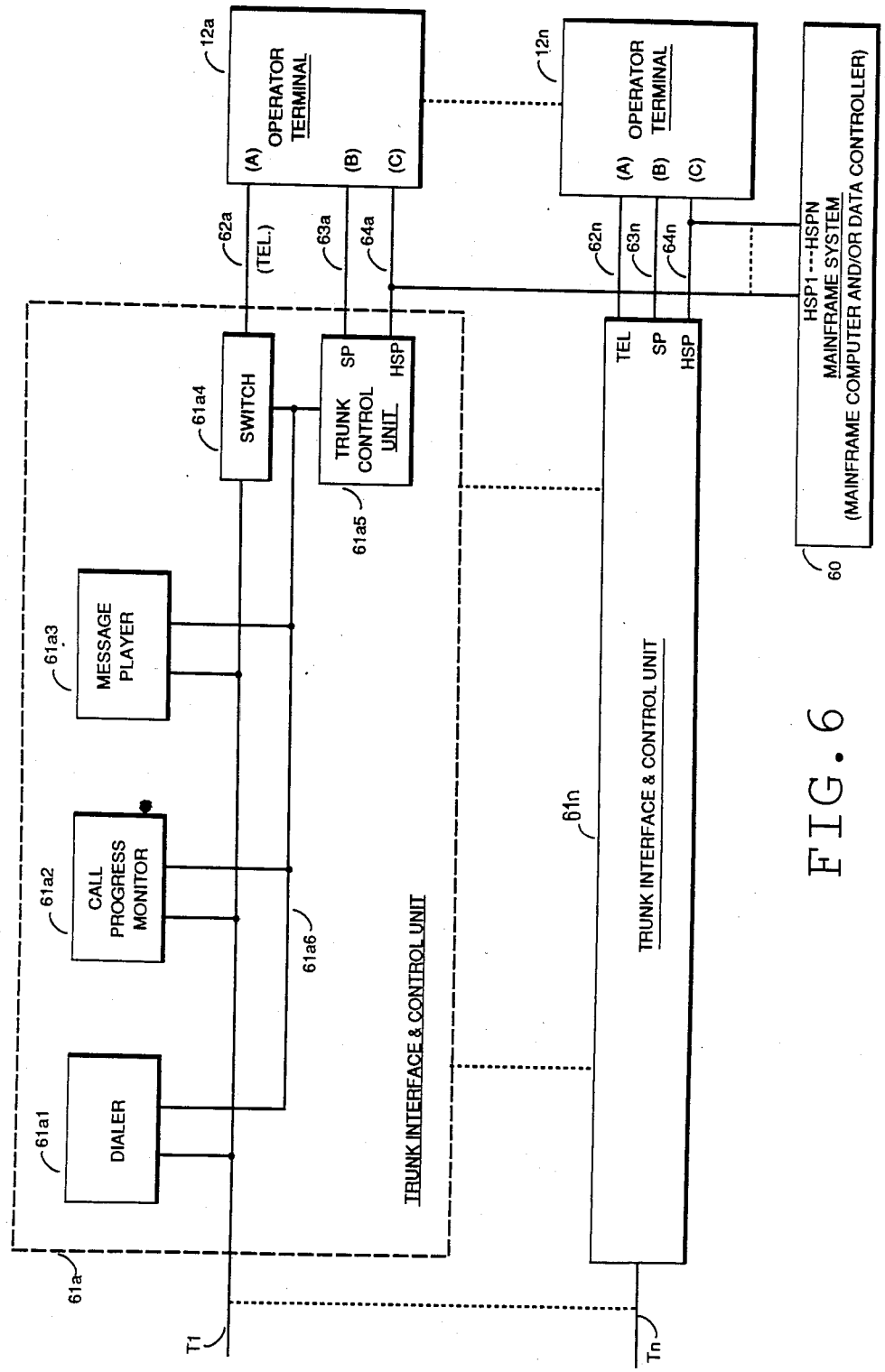
FIG. 6 is a block diagram of an alternative embodiment of the present invention, retrofitted to an existing system.

Turn now to FIG. 6 which is an alternative embodiment of the present invention. FIG. 6 is directed toward retrofitting an existing installation which already has a mainframe computer and/or data controller 60, and several operator terminals 12a-12n, and wherein each operator terminal 12a-12n is dedicated to a particular trunk T1-TN, respectively. Mainframe system 60 has a plurality of high speed coaxial ports HSP1-HSPN. operator terminals 12a-12n are as described in conjunction with FIG. 1. The retrofit comprises a plurality of single trunk interface and control devices 61a-61n. In this embodiment, a device 61, such as device 61a, has a dialer 61a1, a call progress monitor 61a2, a message player 61a3, a trunk switch 61a4, and a control trunk unit 61a5. Dialer 61a1 is constructed and operated in the same manner as dialer 10a1 of FIG. 2, described above. Likewise, call progress monitor 61a2 and message player 61a3 may be constructed and operated in the same manner as call progress monitor 10a5 and message player 10a9, respectively, of FIG. 2. Switch 61a4 selectively connects and disconnects trunk T1 to/from line 62a, which is connected to port A of operator terminal 12a. Trunk control unit 61a5 receives information from and controls the operation of dialer 61a1, call progress monitor 61a2, message player 61a3, and switch 61a4 by means of bus 61a6.

Trunk control unit 61a5 preferably has at least two ports: an RS232 C port (SP); and a coaxial high speed port (HSP). Ports HSP1-HSPN of mainframe system 60 are connected by coaxial conductors 64a-64n, respectively, to port HSP of devices 61a-61n, respectively, and port C of operator terminals 12a-12n, respectively. Port SP of devices 61a-61n are connected by buses 63a-63n, respectively, to port B of operator terminal 12a-12n, respectively.

Consider now the operation of this embodiment. The operator at, for example, operator terminal 12a, will use keyboard 12a6 to advise mainframe system 60 that the operator is available to service another customer. Mainframe 60 then sends the customer account information to operator terminal 12a and/or trunk control unit 61a5 of device 61a. Alternatively, trunk control unit 61a5 can receive the data via operator terminal 12a. Trunk control unit 61a5 then extracts the customer's telephone number from the customer account information, directs dialer 61a1 to dial the customer's telephone number, and then, via call progress monitor 61a2, monitors the status of the outgoing call. Trunk control unit 61a5 then provides, over port SP, the status of the outgoing call to operator terminal 12a. If the telephone of the called party is busy or does not answer after a predetermined period trunk control unit 61a5 will advise operator terminal 12a that the called number is busy or no answer, as appropriate. Then, either automatically or at the instance of the operator, operator terminal 12a or trunk control unit 61a5 will advise mainframe system 60 that the called party could not be reached and request the information for the next customer account.

If the called party answers, as detected by call progress monitor 61a2, trunk control unit 61a5 will advise operator terminal 12a that the called party has answered and also direct switch 61a4 to connect trunk T1 to the telephone 12a1 at operator terminal 12a. Therefore, the operator of operator terminal 12a has again been relieved of the time consuming and inefficient duties of looking at the customer's telephone number on the screen 12a5, dialing the customer's telephone number and waiting for an answer. Furthermore, since the number is dialed automatically by dialer 61a1, the number of incorrectly dialed telephone calls is substantially reduced or eliminated.

Once connected with the customer, the operator can then transact the necessary business with the customer and enter any necessary changes, additions or deletions via keyboard 12a6. Each entry is reported by data terminal 12a4 of operator terminal 12a to mainframe system 60 for immediate updating of the customer account information.

In the event that the called party answers but the operator at operator terminal 12a is temporarily unavailable, such as when assisting an operator at another operator terminal 12, trunk control unit 61a5 will also direct message play 61a3 to begin playing the prerecorded message. In this embodiment, the operator can signal an absence and a return by entering predetermined codes over keyboard 12a6 which is then transmitted by data terminal 12a4 to mainframe system 60 and trunk control unit 61a5.

A simpler version of device 61a comprises only dialer 61a1, switch 61a4, and trunk control unit 61a5. In this embodiment, trunk control unit 61a5 causes switch 61a4 to connect trunk T1 to port A of operator terminal 12a at a point prior to the time at which trunk control unit 61a5 directs dialer 61a1 to disconnect from trunk T1. However, this embodiment still relieves the operator of the duties of looking at the telephone number on the screen and dialing the telephone number.

Based upon the foregoing disclosure, other embodiments and variations of the present invention will be obvious. For example, the time required to dial a number is very small and therefore a single dialer could, with minimal or no delay, accomplish the dialing for a plurality of trunks. If the number of trunks was extremely large then, to minimize the delay, two or more dialers may be used. Therefore, one or more dialers such as dialer 10a1 could be connected to additional line ports (OTL) of cross-point switch 13 and additional serial ports (SP) of system controller 11. System controller 11 would then direct cross-point switch 13 to connect the dialer to the appropriate trunk (T) and instruct the dialer to dial the desired number. Typically, the dialer would only be connected to the trunk for a period sufficient to dial the desired number and would then be connected to another trunk. Therefore, a message player and a trunk interface unit 10 could be instructed by system controller 11 to seize the appropriate line prior to disconnection of the dialer.

Also, if system controller 11 has sufficient capacity then the individual trunk interface control units could be eliminated and system controller 11 could directly access and control the individual dialers. call progress monitors, message players, etc. Furthermore, if sufficient computing capacity and ports are available system controller 11 and data controller 15 could be consolidated into a single controlling device. Likewise, if mainframe computer 16 has sufficient capacity and sufficient ports then the functions of data controller 15 and system controller 11 could be performed by mainframe computer 16.

A message player, such as message player 10a9, preferably contains several indexed messages. The indexing allows trunk interface control unit 10a13 or system controller 11 to command the message player to skip to and being playing a designated message. Therefore, different messages may be played in response to different types of calls. For example, message 1 may be an announcement of the reason that the customer is called, message 2 may be a statement that all operators are temporarily unavailable, message 3 may ask whether the customer wishes to establish an account, place or change an order, etc., and message 4 may ask the customer to key in his telephone number and/or account number, and so forth. Then, an outgoing call will use, for example, messages 1 and 2, whereas in incoming call would use messages 2, 3 and 4. A message player may be either a conventional analog tape player, or an all digital system with the messages stored in memory or on a disk.

A message player may also be used in conjunction with a message recorder. The message recorder may be a separate component or the message player and message recorder may be a single component having separate tapes and/or memories (e.g., disk space) for playing and recording. A system using both a message player and a message recorder, and capable of recording and playing both analog and digital messages, is described in U.S. Pat. No. 4,677,663 above.

The message recorder may record information from customers who have rotary dial telephones instead of DTMF telephones and record the telephone company message provided with the three-tone intercept signal for bad or disconnected numbers. At a later time, the message recorded can be played by an operator to retrieve the information in the message and enter the information into a mainframe 16 via keyboard, such as keyboard 12a5. The information entered is then immediately used by mainframe 16 to update the customer account information database.

In some areas there is, or may be, a legal requirement that, for outgoing calls, especially sales solicitation calls, an operator come on line and ask the called party if he or she desires to hear the prerecorded message before a prerecorded solicitation message may be played. In such a case, after the called party's consent has been given, the operator may press a message start key or code on keyboard 12a5 to advise system controller 11 that the message may be played. The operator may then stay connected to the called party and enter the called party3 s response to the prerecorded message. Alternatively, the operator may then disconnect from the called party and allow the message recorder to record responses. Then, at a later time, an operator retrieves and enters the information provided by the called party.

Figure 7:
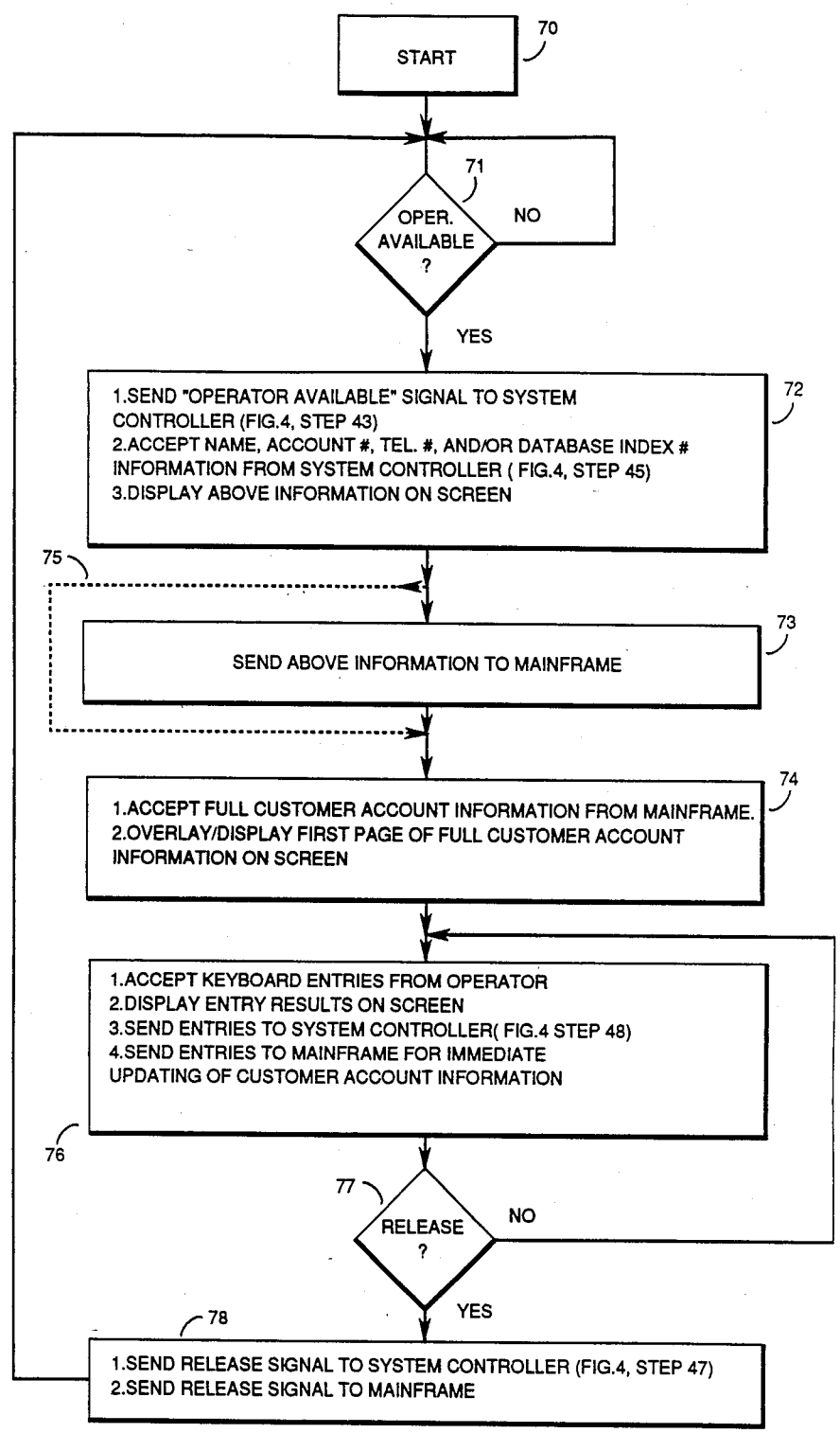
FIG. 7 is a flow chart of the operator terminal logic.

Turn now to FIG. 7 which is a flow chart of the operator terminal logic. Upon starting 70 the first decision 71 determines whether an operator is at the terminal and ready to accept the first call. As previously stated, the operator may signal a presence or an absence by entering the appropriate codes. If the operator is not available, as in a temporary absence, decision 71 is repeated continuously. Once the operator signals, by the appropriate entry, that the operator is available for a call the operator terminal proceeds to step 72. In step 72 the terminal sends the "operator available" signal to system controller 11, accepts the name, account number, telephone number, and/or database index number information from system controller 11, and displays the information received from system controller 11 onto screen 12a5. The terminal then sends 73 the information received from system controller 11 to mainframe 16 (via data controller 15). The terminal then proceeds to step 74. Alternatively, if system controller 11 sends this information to mainframe 16 then it is unnecessary for the operator terminal to execute step 73 and, via bypass 75, shown as a dash line, the terminal proceeds to step 74. At step 74, the terminal accepts the full customer account information from mainframe 16 (via data controller 15), and overlays/displays the first page of the full customer account information on screen 12a5. In some cases, the full customer account information may conveniently fit onto a single screen display. However, in some cases, the customer account information will require more than one screen to display it and therefore the first page is displayed and the operator can direct the operator terminal to display the other pages, as required.

In the next step 76, the operator terminal accepts keyboard entries from the operator, displays the entry results on the screen, sends each entry to the system controller 11, and/or sends each entry to the mainframe 16 for immediate updating of the customer account information. As previously described, mainframe 16 immediately updates the customer account information upon the receipt of an entry so that the information contained in mainframe 16 is always the most current customer account information.

Decision 77 test whether the operator has completed the transactions with the customer and entered a release signal. If a release has not been entered then the operator terminal returns to step 76 for more entries. If a release has been entered then, in step 78, the terminal sends the release signal to system controller 11 and to mainframe 16. The operator terminal then returns to step 71 to determine whether the operator is available to receive another call.

From the above, it will be appreciated that system controller 11 and the operator terminal exchange information and signals so that the operator is automatically connected with the next call and provided with the customer account information for that call, and that the operator terminal and mainframe 16 exchange information in such a manner that the information contained in mainframe 16 and displayed upon the screen 12a5 are the most current customer account information.

Figure 8:
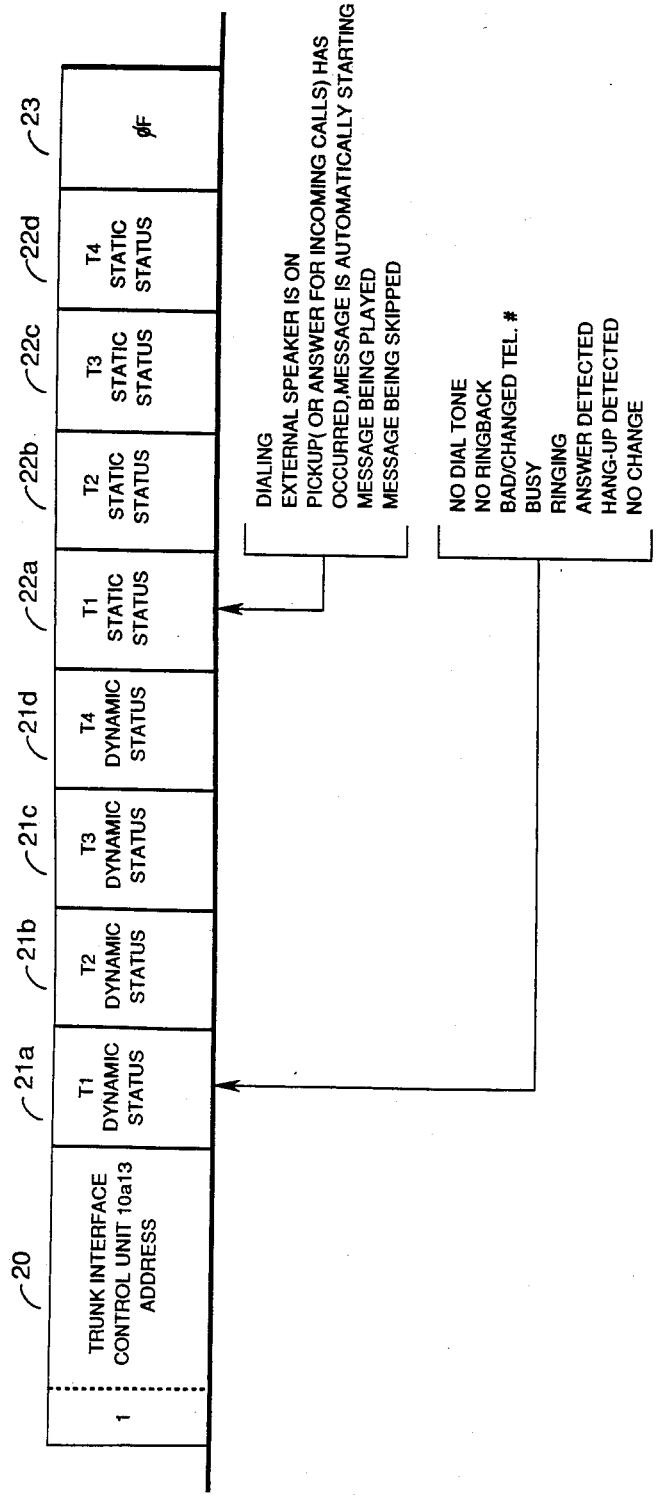
FIG. 8 is an illustration of an alternative trunk status message.

A trunk interface control unit, such as unit 10a13, may also provide status information to system controller 11 via a 10 byte status message. FIG. 8 is an illustration of an alternative status message from a trunk interface control unit to system controller 11. The example shown in FIG. 8 is for a message being sent from trunk interface control unit 10a13 to system controller 11. The first byte 20 is the address of the particular trunk interface control unit responding to the poll. The most significant bit of byte 20 is always a logic "1". The next four bytes 21a–21d are the dynamic status of the four trunks to which the trunk interface unit is connected. For trunk interface unit 10a the status of trunks T1–T4 are reported, for trunk interface unit 10b the status of trunks T5–T8 are reported, and so forth. In the preferred embodiment, the dynamic status is reported as: no dial tone, no ringback, busy, no answer, ringing, answer detected, hand-up detected, and no change. The next four bytes 22a–22d are the static status of the same four trunks. In the preferred embodiment, the static status is reported as: pick-up has occurred; message being played; message being skipped; dialing; and external speaker is on. The last byte 23 is the ASCII shift-in character, OF (hex). The status conditions listed are not intended to be all inclusive but merely exemplary and, depending upon the requirements of the particular business, other status conditions may be included or substituted. Furthermore, although the status is reported as a dynamic status and a static status in the preferred embodiment, it will be appreciated that the status need not be reported in the above manner but may be reported as a status which includes the conditions listed under both the dynamic status and the static status.

Trunk interface control unit 10a13 reports the precise dynamic status or a particular trunk only if there has been a change in the dynamic status of that trunk since the last time the trunk interface control unit was polled by system controller 11. Trunk interface control unit 10a13 automatically clears the dynamic status each time it is polled and, if there has been no change in the dynamic status since the last polling, trunk interface control unit 10a13 will send a "no change" condition.

Since many other embodiments of the present invention may suggest themselves to those skilled in the art based upon the foregoing disclosure, the present invention is to be limited only by the claims below.

We claim:

1. Apparatus for continually updating information on customer accounts stored in a computer system, comprising:
   a plurality of dialing means connected to a plurality of telephone trunks, each said dialing means being for placing an outgoing call by dialing a predetermined telephone number on a predetermined one of said telephone trunks;
   a plurality of call progress monitoring means connected to said plurality of telephone trunks, each said call progress monitoring means being for monitoring the status of a predetermined one of said telephone trunks, said status comprising conditions of ringing, answered, and busy;
   a plurality of operator terminals, each operator terminal comprising a data terminal for displaying and inputting information on one of said customer accounts and an audio communications means;
   trunk switching means for selectively connecting a selected one of said telephone trunks to a selected one of said audio communications means; and
   control means connected to said plurality of dialing means, said plurality of call monitoring means, said data terminals of said plurality of operator terminals, said trunk switching means, and said computer system, for obtaining said information on customer accounts from said computer system extracting a telephone number for at least a selected one of said customer accounts, providing said telephone number as said predetermined telephone number to a selected one of said dialing means, receiving the status of each said outgoing call from said call progress monitoring means and, when a said outgoing call on a said telephone trunk is answered, causing said trunk switching means to connect said telephone trunk to a said audio communications means at an available said operator terminal and providing said information on said selected customer account to said data terminal at said operator terminal, receiving changes on said selected customer account from said data terminal, and providing said changes to said computer system.

2. The apparatus of claim 1 wherein said audio communications means comprises a telephone set.

3. The apparatus of claim 1 wherein said audio communications means comprises a telephone headset.

4. The apparatus of claim 1 wherein said trunk switching means comprises a cross-point switch.

5. The apparatus of claim 1 wherein said trunk switching means comprises a telephone switching system.

6. The apparatus of claim 5 wherein said telephone switching system comprises a private branch exchange (PBX).

7. The apparatus of claim 1 and further comprising:
   a plurality of message player means connected to said plurality of telephone trunks, each said message player means being connected to a predetermined one of said telephone trunks;
   wherein said control means, in response to said outgoing call on said telephone trunk being answered and all of said operator terminals being unavailable, causes a said message player means connected to said telephone trunk to begin playing a prerecorded message and, in response to said operator terminal becoming available, causes said trunk switching means to connect said telephone trunk to said audio communications means at said available operator terminal, causes said message player means to stop playing said prerecorded message, provides said customer account information to said data terminal and said available operater terminal, receives changes on said customer account from said data terminal, and provides said changes to said computer system.

8. The apparatus of claim 1 wherein said control means comprises:
   data controller means; and
   system controller means;
   said data controller means being connected to said computer system, said data terminals of said plurality of operator terminals and said system controller means, for obtaining said information on said customer accounts from said computer system, extracting at least a telephone number for a selected one of said customer accounts, providing said telephone number to said system controller means, providing said information on said selected customer account to said data terminal of an available said operator terminal, receiving changes on said selected customer account from said available data terminal, and providing said changes to said computer system; and
   said system controller means being connected to said plurality of dialing means, said switching means, said call progress monitoring means, said data controller means, and said data terminals of said plurality of operator terminals, for receiving said telephone number for said selected customer account, providing said telephone number as said predetermined telephone number to a selected one of said dialing means, receiving the status of each outgoing call from said call progress monitoring means and, when a said outgoing call on a said telephone truck to a said audio communications means at an available operator terminal, and providing a predetermined portion of said information on said selected customer account to said data terminal of said available operator terminal.

9. The apparatus of claim 8 wherein said data controller means provides said information on said selected customer account to said available data terminal in response to said available data terminal providing at least part of said predetermined portion of said information on said selected customer account to said data controller means.

10. The apparatus of claim 9 wherein said available data terminal provides said part of said predetermined portion of said information on said selected customer account in response to receipt of said predetermined portion of said information from said system controller means.

11. The apparatus of claim 9 wherein said available data terminal provides said part of said predetermined portion of said information on said selected customer account in response to an operator at said available data terminal entering a predetermined code.

12. A method for online updating of a plurality of data associated with a corresponding plurality of customer accounts contained in an information storage system, comprising the steps of:
   (a) obtaining said data on a selected one of said customer accounts from said information storage system;
   (b) extracting a customer telephone number from said data on said selected one of said customer accounts;
   (c) seizing a selected trunk of a plurality of telephone trunks;
   (d) placing an outgoing call by causing said customer telephone number to be dialed on said selected trunk;
   (e) monitoring said selected trunk to determine if said outgoing call has been answered;
   (f) if said outgoing call has been answered then:
      (i) placing a message on said selected trunk;
      (ii) monitoring said selected trunk for a response to said message;
      (iii) determining whether said response to said message indicates operator assistance is required;
      (iv) if said operator assistance is required then:
         (A) connecting said selected trunk to a selected one of a plurality of operator audio communications devices;
         (B) sending at least a predetermined portion of said data on said selected one of said customer accounts to a selected one of a plurality of operator data terminals;
         (C) providing data entries made at said selected one of said operator data terminals to said information storage system; and
         (D) causing said information storage system to update said data for said selected one of said customer accounts by incorporating said data entries into said data for said selected one of said customer accounts; or
      (v) if said operator assistance is not required then:
         (A) providing said response to said information storage system; and
         (B) causing said information storage system to update said data for said selected one of said customer accounts by incorporating said response into said data for said selected one of said customer accounts; or
   (g) if said outgoing call has not been answered then releasing said selected trunk.

13. The method of claim 12 wherein said message prompts said response by indicating that said response should be voice words.

14. The method of claim 13 wherein said message indicates that said response should be from a predetermined group of voice words.

15. The method of claim 12 wherein said message prompts said response by indicating that said response should be provided using a telephone keypad.

16. The method of claim 12 wherein a record of said data entries is maintained separately from a record containing said data on said selected one of said customer accounts.

17. The method of claim 12 wherein, at step (f)(iv)(B), said predetermined portion of said data comprises a complete record of said data on said selected customer account.

18. The method of claim 12 wherein, at step (f)(iv)(B), said selected one of said operator data terminals requests an additional portion of said data on said selected one of said customer accounts and said additional portion of said data is provided to said selected one of said operator data terminals.

19. The method of claim 18 wherein said selected one of said operator data terminals requests said additional portion of said data in response to a predetermined key entry by an operator.

20. The method of claim 18 wherein said selected one of said operator data terminals requests said additional portion of said data in response to receipt of said predetermined portion of said data.

21. The method of claim 12 wherein step (g) further comprises:
   updating said data for said selected one of said customer accounts to indicate that said outgoing call was not answered.

22. The method of claim 12 wherein:
   step (e) further comprises monitoring said selected trunk to determine whether busy signals, unanswered ringing signals, or other call progress signals are present; and
   step (g) further comprises updating said data for said selected one of said customer accounts to indicate that said busy signals, said unanswered ringing signals, or said other call progress signals are present.

23. The method of claim 12 wherein:
   step (a) comprises obtaining said data for a predetermined number of said customer accounts; and
   steps (b) through (g) are performed for each said selected one of said customer accounts of said predetermined number of customer accounts.

24. The method of claim 23 wherein step (g) further comprises:
   updating said data for said selected one of said customer accounts to indicate that said outgoing call was not answered.

25. The method of claim 23 wherein:
   step (e) further comprises monitoring said selected trunk to determine whether busy signals, unanswered ringing signals, or other call progress signals are present; and step (g) further comprises updating said data for said selected one of said customer accounts to indicate that said busy signals, said unanswered ringing signals, or said other call progress signals are present.

26. The method of claim 12 wherein step (f)(v) further comprises:

(C)
   (I) placing a next message on said selected trunk;
   (II) monitoring said selected trunk for a response to said next message;
   (III) determining whether said response to said next message indicates operator assistance is required;
   (IV) if said operator assistance is required, proceeding to step (f)(iv)(A); and
   (V) if said operator assistance is not required, proceeding to step (f)(v)(A).

27. The method of claim 26 and further comprising:
releasing said selected trunk in response to a predetermined response to said next message.

28. The method of claim 12 and further comprising:
releasing said selected trunk in response to a predetermined response to said message.

29. Apparatus for online updating of data on customer accounts contained in an information storage system, comprising:
   dialing means for placing an outgoing call by dialing a telephone number on a telephone trunk;
   call progress monitoring means connected to said telephone trunk for monitoring said telephone trunk and providing a status on said telephone trunk;
   an operator terminal comprising a data terminal and an audio communications means;
   trunk switching means for selectively connecting said telephone trunk to said audio communications means;
   control means for obtaining said data on at least one said customer account from said information storage system, extracting a customer telephone number from said data for a selected said customer account, providing said customer telephone number to said dialing means monitoring said status of said telephone trunk and, if said outgoing call is answered, causing said trunk switching means to connect said telephone trunk to said audio communications means, and providing at least a predetermined portion of said data on said selected said customer account to said data terminal;
   whereby said data terminal provides data entries made at said data terminal to said information storage system; and
   said information storage system updates said data for said selected said customer account by incorporating said data entries into said data for said selected said customer account.

30. The apparatus of claim 29 wherein said data terminal requests an additional portion of said data on said selected customer account.

31. The apparatus of claim 30 wherein said data terminal requests said additional portion of said data in response to a predetermined key entry by an operator.

32. The apparatus of claim 30 wherein said data terminal requests said additional portion of said data in response to receipt of said predetermined portion of said data.

33. The apparatus of claim 29 wherein said control means provides a complete record of said data on said selected customer account to said data terminal.

34. The apparatus of claim 29 and further comprising:
   message player means for placing a predetermined message on said telephone trunk for prompting a called party to provide a response;
   decoder means responsive to signals placed upon said telephone trunk by said called party for providing a decoded response;
   wherein said control means is responsive to said status of said telephone trunk indicating that said outgoing call has been answered for causing said message player means to place a first said predetermined message on said telephone trunk, and responsive to said decoded response for determining whether assistance from an operator is required;
   wherein, if said assistance is required, said control means causes said trunk switching means to connect said telephone trunk to said audio communications means, and provides at least said predetermined portion of said data on said selected said customer account to said data terminal, and said data terminal provides data entries made at said data terminal by said operator to said information storage system, and said information storage system updates said data for said selected for customer account by incorporating said data entries into said data for said selected said customer account; and
   if said assistance is not required, said control means provides said decoded response as data entries to said information storage system, said information storage system updates said data for said selected said customer account by incorporating said data entries into said data for said selected said customer account, and said control means causes said message player means to place a next predetermined message on said telephone trunk.

35. The apparatus of claim 34 wherein said next predetermined message prompts said called party to provide another response.

36. The apparatus of claim 34 wherein at least one said predetermined message prompts said called party to provide said response using a telephone keypad, and said decoder means comprises a tone decoder.

37. The apparatus of claim 34 wherein at least one said predetermined message prompts said called party to provide said response using voice words, and said decoder means comprises a voice decoder.

38. The apparatus of claim 34 wherein said control means comprises:
   a data controller;
   a system controller; and
   a trunk interface unit;
   said data controller for receiving said data on said customer accounts, providing said decoded response to said information storage system, and providing said data to said system controller and to said data terminal;
   said system controller for receiving said data from said data controller, extracting said customer telephone number, sending said extracted customer telephone number to said trunk interface unit, monitoring said status of said trunk via said trunk interface unit, controlling said trunk switching means, and providing at least said predetermined portion of said data on said selected said customer account to said data terminal; and said trunk interface unit for receiving said extracted customer telephone number, providing said extracted customer telephone number to said dialing means, causing said dialing means to place said extracted customer telephone number on said trunk, receiving said decoded response, activating said message player means, receiving said status from said call progress monitoring means, and proving a combined ring detect status and call progress status as said status to said system controller.

39. The apparatus of claim 29 wherein said control means causes said information storage system to provide a complete record of said data on said selected customer account to said data terminal.

40. The apparatus of claim 29 wherein said control means comprises:
a data controller,
a system controller; and
a trunk interface unit;
said data controller for receiving said data on said customer accounts and providing said data to said system controller and to said data terminal;
said system controller for receiving said data from said data controller, extracting said customer telephone number, sending said extracted customer telephone number to said trunk interface unit, monitoring said status of said trunk via said trunk interface unit, controlling said trunk switching means, and providing at least said predetermined portion of said data on said selected said customer account to said data terminal; and
said trunk interface unit for receiving said extracted customer telephone number, providing said extracted customer telephone number to said dialing means, causing said dialing means to place said extracted customer telephone number on said trunk, receiving said status from said call progress monitoring means, and providing said status to said system controller.

41. The apparatus of claim 37 wherein at least one said predetermined message prompts said called party to provide a response using a predetermined group of voice words.

42. Apparatus for online updating of data on customer accounts contained in an information storage system, comprising:
an operator terminal comprising a data terminal and an audio communications means;
trunk switching means for selectively connecting a telephone trunk to said audio communications means;
incoming call detection means for providing a ring detect signal when an incoming call occurs on said telephone trunk;
automatic number identification (ANI) decoder means responsive to predetermined signals on said telephone trunk for providing a calling party telephone number;
control means responsive to said ring detect signal for causing said trunk switching means to connect said telephone trunk to said audio communications means, and responsive to said calling party telephone number for causing said information storage system to provide to said data terminal said data on a selected said customer account which has a said customer telephone number corresponding to said calling party telephone number;
whereby said data terminal provides data entries made at said data terminal to said information storage system; and
said information storage system updates said data for said selected said customer account by incorporating said data entries into said data for said customer account.

43. The apparatus of claim 42 wherein said information storage system provides said data directly to said data terminal.

44. The apparatus of claim 42 wherein said information storage system provides said data to said data terminal by way of said control means.

45. The apparatus of claim 42 and further comprising:
a plurality of said operator terminals;
a plurality of said incoming call detection means, each of said incoming call detection means for providing a said ring detect signal when a said incoming call occurs on a predetermined trunk of a plurality of telephone trunks; and
a plurality of said ANI decoder means, each of said ANI decoder means being responsive to said predetermined signals on a predetermined said trunk for providing a said calling party telephone number,
wherein said trunk switching means selectively connects selected ones of said telephone trunks to selected ones of said audio communications means; and
wherein said control means monitors each of said operator terminals to determine whether each said operator terminal is available or not available and, when a said incoming call occurs on one of said telephone trunks, said control means receives said calling party telephone number from said ANI decoder means for said one of said trunks, provides said calling party telephone number to said data terminal of an available said operator terminal and to said information storage system, causes said information storage system to provide to said data terminal said data on a said customer account which has a said customer telephone number corresponding to said calling party telephone number, and causes said trunk switching means to connect said one of said trunks to a said audio communications means of said available said operator terminal.

46. The apparatus of claim 45 and further comprising:
message player means for placing a message on a selected one of said telephone trunks;
wherein, when an incoming call occurs on one of said telephone trunks and a said operator terminal is not available, said control means causes said message player means to place said message on said telephone trunk having said incoming call.

47. The apparatus of claim 46 wherein said message player means comprises:
a plurality of message playing devices, each of said devices being for placing a said message on a predetermined one of said telephone trunks.

48. The apparatus of claim 42 and further comprising:
message player means for placing a predetermined message on said telephone trunk for prompting a calling party to provide a response; and
decoder means responsive to signals placed on said telephone trunk by said calling party for providing a decoded response;

wherein said control means is further responsive to said decoded response for determining whether assistance from an operator is required;

wherein, if said assistance is required, said control means causes said trunk switching means to connect said telephone trunk to said audio communications means, whereby said data terminal provides data entries made at said data terminal by said operator to said information storage system, and said information storage system updates said data for said selected said customer account by incorporating said data entries into said data for said customer account; and if said assistance is not required, said control means provides said decoded response as data entries to said information storage system, said information storage system updates said data for said selected said customer account by incorporating said data entries into said data for said selected said customer account, and said control means causes said message player means to place a next predetermined message on said telephone trunk.

49. The apparatus of claim 48 wherein said next predetermined message prompts said calling party provide another response.

50. The apparatus of claim 48 wherein at least one said predetermined message prompts said calling party to provide said response using a telephone keypad and said decoder means comprises a tone decoder.

51. The apparatus of claim 48 wherein at least one said predetermined message prompts said calling party to provide said response using voice words and said decoder means comprises a voice decoder.

52. The apparatus of claim 51 wherein at least one said predetermined message prompts said calling party to provide said response using a predetermined group of voice words.

53. Apparatus for online updating of data on customer accounts contained in an information storage system, comprising:
an operator terminal comprising a data terminal and an audio communications means;
trunk switching means for selectively connecting a telephone trunk to said audio communications means;
incoming call detection means for providing a ring detect signal when an incoming call occurs on said telephone trunk;
message player means for placing a predetermined message on said telephone trunk for prompting a calling party to provide a response;
decoder means responsive to signals placed on said telephone trunk by said calling party for providing a decoded response; and
control means responsive to said ring detect signal for causing said message player means to place a first predetermined said message on said telephone trunk, and responsive to said decoded response for determining whether assistance from an operator is required;
wherein, if said assistance is required, said control means causes said trunk switching means to connect said telephone trunk to said audio communications means, whereby said data terminal provides data entries made at said data terminal by said operator to said information storage system, and said information storage system updates said data for said customer account of said calling party by incorporating said data entries into said data for said customer account; and
if said assistance is not required, said control means provides said decoded response as data entries to said information storage system, said information storage system updates said data for said customer account by incorporating said data entries into said data for said customer account, and said control means causes said message player means to place a next predetermined message on said telephone trunk.

54. The apparatus of claim 53 wherein:
said first said predetermined message prompts said calling party to provide a calling party telephone number;
said control means provides said calling party telephone number to said information storage system;
said information storage system advises said control means whether data is available for a said customer account having a customer telephone number corresponding to said calling party telephone number; and
if said data is not available, said control means determines that said assistance is required and, further, provides said calling party telephone number to said data terminal.

55. The apparatus of claim 54 wherein, if said data is available, said control means causes said trunk switching means to connect said telephone trunk to said audio communications means and causes said information storage system to provide at least a predetermined portion of said data for said selected said customer account to said data terminal, said data terminal provides data entries made at said data terminal by said operator to said information storage system, and said information storage system updates said data for said customer account by incorporating said data entries into said data for said customer account.

56. The apparatus of claim 53 wherein:
said first said predetermined message prompts said calling party to provide a calling party customer account number;
said control means provides said calling party customer account number to said information storage system;
said information storage system advises said control means whether data is available for a said customer account having a said customer account number corresponding to said calling party customer account number; and
if said data is available, said control means determines that said assistance is required and, further, provides said calling party customer account number to said data terminal.

57. The apparatus of claim 56 wherein, if said data is available, said control means causes said trunk switching means to connect said telephone trunk to said audio communications means and causes said information storage system to provide at least a predetermined portion of said data for said selected said customer account to said data terminal, said data terminal provides data entries made at said data terminal by said operator to said information storage system, and said information storage system updates said data for said selected said customer account by incorporating said data entries into said data for said selected said customer account.

58. The apparatus of claim 53 wherein said next predetermined message prompts said calling party to provide another response.

59. The apparatus of claim 53 wherein at least one said predetermined message prompts said calling party to provide said response using a telephone keypad and said decoder means comprises a tone decoder.

60. The apparatus of claim 53 wherein at least one said predetermined message prompts said calling party to provide said response using voice words and said decoder means comprises a voice decoder.

61. The apparatus of claim 60 wherein at least one said predetermined message prompts said calling party to provide said response using a predetermined group of voice words.

62. The apparatus of claim 53 and further comprising:
a plurality of said operator terminals;
a plurality of said incoming call detection means, each of said incoming call detection means being for providing a said ring detect signal when a said incoming call occurs on a predetermined trunk of a plurality of said telephone trunks; and
a plurality of said decoder means, each of said decoder means being responsive to said signals on a predetermined said trunk for providing said decoded response;
wherein said trunk switching means selectively connects selected ones of said telephone trunks to selected ones of said audio communications means; and
wherein said control means monitors each of said operator terminals to determine whether each said operator terminal is available or not available and, if said assistance is required and a said operator terminal is not available, causes said message player means to place another predetermined message on said telephone trunk having said incoming call and, when a said operator terminal becomes available, causes said trunk switching means to connect said telephone trunk having said incoming call to said audio communications means of said available operator terminal.

63. The apparatus of claim 62 wherein said message player means comprises:
a plurality of message playing devices, each of said devices being for placing at least one said predetermined message on a predetermined one of said telephone trunks.

64. The apparatus of claim 53 wherein said control means evaluates each said decoded response to determine whether said assistance is required; and,
if said assistance is not required, said control means provides said decoded response as data entries to said information storage system, said information storage system updates said data for said selected said customer account by incorporating said data entries into said data for said selected said customer account, and said control means causes said message player means to place a next message on said telephone trunk; and,
if said assistance is required, said control means causes said trunk switching means to connect said telephone trunk to said audio communications means and causes said information storage system to provide at least a predetermined portion of said data for said selected said customer account to said data terminal, said data terminal provides data entries made at said data terminal by said operator to said information storage system, and said information storage system updates said data for said selected said customer account by incorporating said data entries into said data for said selected said customer account.

65. In an automated telephone calling system characterized by
first means for storing, retrieving, and processing data on a plurality of accounts,
second means for initiating outgoing calls on a plurality of telephone trunks,
third means for providing telephone numbers, corresponding to said accounts, to said second means,
fourth means for detecting an answer of a said outgoing call,
fifth means for selectively connecting a particular said telephone trunk to a particular one of a plurality of audio communications means, and
a plurality of data terminals for sending and receiving said data, each of said data terminals being associated with a corresponding audio communications means, each said data terminal being characterized by a keyboard for providing data entries and a display; the improvement to a said data terminal, comprising:
first interface means for allowing said data terminal to receive at least a first predetermined portion of said data on a selected one of said accounts from said third means; and
second interface means for allowing said data terminal to receive at least a second predetermined portion of said data from said first means and to send said data entries to said first means.

66. The improvement of claim 65 wherein said first interface means comprises a serial data port.

67. The improvement of claim 65 wherein said second interface means comprises a high speed serial data port.

68. The improvement of claim 65 wherein, upon receipt of said first predetermined portion of said data from said third means, said data terminal requests at least said second predetermined portion of said data from said first means, and said first means provides at least said second predetermined portion of said data to said data terminal.

69. The improvement of claim 68 wherein said first predetermined portion comprises a telephone number of said telephone numbers which corresponds to a said outgoing call which has been answered.

70. The improvement of claim 68 wherein said first predetermined portion comprises an account number corresponding to a said outgoing call which has been answered.

71. The improvement of claim 68 wherein said first predetermined portion comprises a data base index number corresponding to a said outgoing call which has been answered.

72. The improvement of claim 68 wherein said data terminal requests at least said second predetermined portion of said data in response to an operator entry on said keyboard.

73. The improvement of claim 65 wherein said data terminal provides said data entries to both said first means and said third means.

* * * * *